(12) United States Patent
Durkin

(10) Patent No.: US 12,503,826 B2
(45) Date of Patent: Dec. 23, 2025

(54) LIFT ARM ARRANGEMENTS FOR POWER MACHINES

(71) Applicant: Doosan Bobcat North America, Inc., West Fargo, ND (US)

(72) Inventor: Brent Durkin, Bismarck, ND (US)

(73) Assignee: Doosan Bobcat North America, Inc., West Fargo, ND (US)

(*) Notice: Subject to any disclaimer, the term of this patent is extended or adjusted under 35 U.S.C. 154(b) by 0 days.

(21) Appl. No.: 18/885,270

(22) Filed: Sep. 13, 2024

(65) Prior Publication Data
US 2025/0003175 A1 Jan. 2, 2025

Related U.S. Application Data

(63) Continuation of application No. 17/902,162, filed on Sep. 2, 2022, now Pat. No. 12,247,371.

(60) Provisional application No. 63/292,679, filed on Dec. 22, 2021, provisional application No. 63/240,151, filed on Sep. 2, 2021.

(51) Int. Cl.
E02F 3/34 (2006.01)
E02F 3/43 (2006.01)

(52) U.S. Cl.
CPC .......... E02F 3/432 (2013.01); *E02F 3/3414* (2013.01)

(58) Field of Classification Search
None
See application file for complete search history.

(56) References Cited

U.S. PATENT DOCUMENTS

| 3,585,473 | A | 6/1971 | Huxtable et al. |
| 5,509,491 | A | 4/1996 | Hall |
| 5,647,721 | A | 7/1997 | Rohrbaugh |
| 5,884,204 | A | 3/1999 | Orbach et al. |
| 6,061,617 | A | 5/2000 | Berger et al. |
| 6,078,855 | A | 6/2000 | Kinugawa et al. |
| 6,140,787 | A | 10/2000 | Lokhorst et al. |
| 6,273,198 | B1 | 8/2001 | Bauer et al. |
| 6,286,236 | B1 | 9/2001 | Bowers |
| 6,832,659 | B1 * | 12/2004 | Bares ............. B62D 55/12 180/9.56 |
| 7,058,495 | B2 | 6/2006 | Budde et al. |

(Continued)

FOREIGN PATENT DOCUMENTS

| CA | 2996429 A1 | 3/2017 |
| JP | 2007224585 A | 9/2007 |

(Continued)

OTHER PUBLICATIONS

International Searching Authority. International Search Report and Written Opinion for International Application No. PCT/US2021/020525. Mailed on Oct. 8, 2021. 25 pages.

(Continued)

*Primary Examiner* — Michael S Lowe
(74) *Attorney, Agent, or Firm* — Quarles & Brady, LLP

(57) ABSTRACT

A lift arm structure for a power machine with a frame can include a lift arm and an electrical lift actuator. The lift arm can be configured to be movably secured to the frame to extend along a lateral side of the frame. The electrical lift actuator can be secured to the lift arm within a pocket defined by the lift arm and can be configured to extend and retract between the lift arm and the frame of the power machine to raise and lower the lift arm.

17 Claims, 16 Drawing Sheets

(56) References Cited

U.S. PATENT DOCUMENTS

| | | |
|---|---|---|
| RE39,179 E | 7/2006 | Naunheimer et al. |
| 7,326,141 B2 | 2/2008 | Lyons et al. |
| 7,443,122 B2 | 10/2008 | Tate et al. |
| 7,493,205 B2 | 2/2009 | Du et al. |
| 7,511,449 B2 | 3/2009 | Speckhart et al. |
| 7,657,841 B2 | 2/2010 | Shibamori et al. |
| 7,658,250 B2 | 2/2010 | Betz et al. |
| 7,673,402 B2 | 3/2010 | Wakitani et al. |
| 7,779,616 B2 | 8/2010 | Sheidler et al. |
| 7,779,947 B2 | 8/2010 | Stratton |
| 7,900,722 B2 | 3/2011 | Shimada et al. |
| 7,904,224 B2 | 3/2011 | Kanayama et al. |
| 7,950,481 B2 | 5/2011 | Betz et al. |
| 8,100,210 B2 | 1/2012 | Takeuchi et al. |
| 8,125,105 B2 | 2/2012 | Ishida et al. |
| 8,219,273 B2 | 7/2012 | Bissontz |
| 8,478,470 B1 | 7/2013 | Meads et al. |
| 8,485,286 B2 | 7/2013 | Thompson |
| 8,589,037 B2 | 11/2013 | Jensen |
| 8,606,442 B2 | 12/2013 | Kang et al. |
| 8,631,890 B2 | 1/2014 | Noguchi et al. |
| 8,672,069 B2 | 3/2014 | Cherney et al. |
| 8,727,055 B2 | 5/2014 | Matsumura et al. |
| 8,773,056 B2 | 7/2014 | Gerdes et al. |
| 8,798,875 B2 | 8/2014 | Yanagisawa et al. |
| 8,855,875 B2 | 10/2014 | Frank et al. |
| 8,909,434 B2 | 12/2014 | Anders et al. |
| 8,972,121 B2 | 3/2015 | Kurikuma et al. |
| 8,991,184 B2 | 3/2015 | Ooki et al. |
| 8,996,214 B2 | 3/2015 | Ishii |
| 9,016,052 B2 | 4/2015 | Cho |
| 9,057,173 B2 | 6/2015 | Hiroki et al. |
| 9,102,313 B2 | 8/2015 | Bissontz |
| 9,156,341 B2 | 10/2015 | Matsumura et al. |
| 9,163,376 B2 | 10/2015 | Nicholson |
| 9,181,682 B2 | 11/2015 | Anders et al. |
| 9,187,880 B2 | 11/2015 | Tsuruga et al. |
| 9,190,852 B2 | 11/2015 | Bienfang et al. |
| 9,228,322 B2 | 1/2016 | Keys et al. |
| 9,263,975 B2 | 2/2016 | Wang et al. |
| 9,290,908 B2 | 3/2016 | Hiroki et al. |
| 9,347,203 B2 | 5/2016 | Tsuruga et al. |
| 9,422,141 B2 | 8/2016 | Foley |
| 9,475,497 B2 | 10/2016 | Henson et al. |
| 9,562,592 B2 | 2/2017 | Rekow et al. |
| 9,562,603 B2 | 2/2017 | Ziskovsky et al. |
| 9,574,324 B2 | 2/2017 | Satake et al. |
| 9,604,669 B2 | 3/2017 | Sonnenburg et al. |
| 9,617,706 B2 | 4/2017 | Takemura et al. |
| 9,624,643 B2 | 4/2017 | Hendron et al. |
| 9,637,000 B2 | 5/2017 | Husson et al. |
| 9,637,006 B2 | 5/2017 | Lindsey et al. |
| 9,725,878 B2 | 8/2017 | Amano et al. |
| 9,729,008 B2 | 8/2017 | Votoupal et al. |
| 9,739,273 B2 | 8/2017 | Marquette et al. |
| 9,745,723 B2 | 8/2017 | Inoue et al. |
| 9,775,275 B2 | 10/2017 | Yi et al. |
| 9,828,741 B2 | 11/2017 | Shipman |
| 9,845,587 B2 | 12/2017 | Huissoon |
| 9,896,822 B2 | 2/2018 | Kohno et al. |
| 9,975,426 B2 | 5/2018 | McCann |
| 9,988,791 B2 | 6/2018 | Uji et al. |
| 10,054,119 B2 | 8/2018 | Sasaki |
| 10,066,358 B2 | 9/2018 | Ota et al. |
| 10,100,493 B2 | 10/2018 | Takeo |
| 10,112,600 B2 | 10/2018 | Merkle et al. |
| 10,132,055 B2 | 11/2018 | Sharkey |
| 10,132,259 B1 | 11/2018 | Watson et al. |
| 10,183,673 B2 | 1/2019 | Miller et al. |
| 10,188,039 B2 | 1/2019 | Engel |
| 10,228,046 B2 | 3/2019 | Parmar |
| 10,232,699 B2 | 3/2019 | Oyama et al. |
| 10,239,535 B2 | 3/2019 | Yoo |
| 10,246,853 B2 | 4/2019 | Huissoon |
| 10,253,479 B2 | 4/2019 | Kaneta et al. |
| 10,308,108 B2 | 6/2019 | Honda et al. |
| 10,355,554 B2* | 7/2019 | Parmar .................. F16H 25/20 |
| 10,407,875 B2 | 9/2019 | Kawaguchi et al. |
| 10,435,863 B2 | 10/2019 | Ishihara et al. |
| 10,450,723 B2 | 10/2019 | Osaka et al. |
| 10,450,725 B2 | 10/2019 | Kobayashi et al. |
| 10,458,095 B2 | 10/2019 | Caillieret et al. |
| 10,472,805 B1 | 11/2019 | Kumeuchi et al. |
| 10,550,541 B1 | 2/2020 | Diaz et al. |
| 10,731,321 B1* | 8/2020 | Lykken .................. E02F 3/28 |
| 10,815,637 B2 | 10/2020 | Panni et al. |
| 11,697,922 B2* | 7/2023 | Sinn ................. E02F 9/2825 |
| | | 37/455 |
| 2003/0197420 A1 | 10/2003 | Burton |
| 2004/0030919 A1 | 2/2004 | Moriya et al. |
| 2009/0020369 A1 | 1/2009 | Warachka |
| 2010/0025058 A1 | 2/2010 | Carter et al. |
| 2011/0179896 A1 | 7/2011 | Hiraku et al. |
| 2012/0207620 A1 | 8/2012 | Dalum et al. |
| 2013/0011233 A1 | 1/2013 | Watanabe et al. |
| 2013/0075171 A1 | 3/2013 | Noguchi et al. |
| 2013/0076128 A1 | 3/2013 | Nee |
| 2013/0078071 A1 | 3/2013 | Noguchi et al. |
| 2013/0243557 A1 | 9/2013 | Hiroki et al. |
| 2013/0283947 A1 | 10/2013 | Yamada et al. |
| 2014/0117934 A1 | 5/2014 | Kurikuma et al. |
| 2014/0271078 A1 | 9/2014 | Koch |
| 2014/0373534 A1 | 12/2014 | Jensen |
| 2015/0214864 A1 | 7/2015 | Sopko |
| 2016/0031323 A1 | 2/2016 | Gottemoller |
| 2016/0257215 A1 | 9/2016 | Merkle et al. |
| 2017/0089039 A1 | 3/2017 | Imai et al. |
| 2017/0100974 A1 | 4/2017 | Smith |
| 2017/0284062 A1 | 10/2017 | Osaka et al. |
| 2017/0291501 A1 | 10/2017 | Takahashi et al. |
| 2017/0292243 A1 | 10/2017 | Okada et al. |
| 2017/0314233 A1 | 11/2017 | Egawa et al. |
| 2017/0335541 A1 | 11/2017 | Caillieret et al. |
| 2017/0362797 A1 | 12/2017 | Nakagawa et al. |
| 2018/0062555 A1 | 3/2018 | Sagawa et al. |
| 2018/0072281 A1 | 3/2018 | Bruyere et al. |
| 2018/0118014 A1 | 5/2018 | Wantschik |
| 2018/0163364 A1 | 6/2018 | Huissoon |
| 2018/0172122 A1 | 6/2018 | Parmar |
| 2018/0236878 A1 | 8/2018 | Munst et al. |
| 2018/0238016 A1 | 8/2018 | Seacat et al. |
| 2018/0239849 A1 | 8/2018 | Martinsson et al. |
| 2018/0282141 A1 | 10/2018 | Wadell |
| 2018/0305889 A1 | 10/2018 | Schiwal |
| 2018/0338414 A1 | 11/2018 | Manji et al. |
| 2018/0347154 A1 | 12/2018 | Martinsson et al. |
| 2018/0370773 A1 | 12/2018 | Biadun |
| 2019/0024342 A1 | 1/2019 | Yoshida et al. |
| 2019/0032306 A1 | 1/2019 | Jimbo et al. |
| 2019/0104685 A1 | 4/2019 | Engel |
| 2019/0106130 A1 | 4/2019 | Pocha et al. |
| 2019/0111773 A1 | 4/2019 | Nishikawa et al. |
| 2019/0115772 A1 | 4/2019 | Takeda et al. |
| 2019/0141887 A1 | 5/2019 | Matsuda et al. |
| 2019/0156595 A1 | 5/2019 | Manji et al. |
| 2019/0194910 A1 | 6/2019 | Takahashi et al. |
| 2019/0292747 A1 | 9/2019 | Takehara et al. |
| 2019/0292753 A1 | 9/2019 | Oka et al. |
| 2019/0293158 A1 | 9/2019 | Brown |
| 2019/0301144 A1 | 10/2019 | Kean et al. |
| 2019/0308511 A1 | 10/2019 | Bindl et al. |
| 2019/0319523 A1 | 10/2019 | Jin et al. |
| 2019/0330823 A1 | 10/2019 | Kean |
| 2019/0351910 A1 | 11/2019 | Kassen et al. |
| 2020/0122794 A1 | 4/2020 | Hanson |
| 2021/0123207 A1 | 4/2021 | Vandergrift et al. |
| 2023/0060424 A1 | 3/2023 | Durkin |
| 2023/0109143 A1 | 4/2023 | Vollmar et al. |

(56) References Cited

U.S. PATENT DOCUMENTS

| | | |
|---|---|---|
| 2023/0279641 A1 | 9/2023 | Young et al. |
| 2025/0043533 A1* | 2/2025 | Javadi .................. E02F 9/2833 |

FOREIGN PATENT DOCUMENTS

| | | |
|---|---|---|
| JP | 2012202067 A | 10/2012 |
| WO | 2011158618 A1 | 12/2011 |
| WO | 2013114451 A1 | 8/2013 |
| WO | 2017040643 A1 | 3/2017 |
| WO | 2019192669 A1 | 10/2019 |
| WO | 2021178441 A2 | 9/2021 |

OTHER PUBLICATIONS

International Searching Authority, International Search Report and Written Opinion for counterpart application PCT/US2022/042460. Mailed on Jan. 10, 2023 [16 pgs.].

\* cited by examiner

LIFT ARM ARRANGEMENTS FOR POWER MACHINES

CROSS-REFERENCE TO RELATED APPLICATIONS

This application is a continuation of U.S. application Ser. No. 17/902,162, filed Sep. 2, 2022, which claims priority to and the benefit of U.S. Provisional Patent Application No. 63/292,679, filed Dec. 22, 2021, and U.S. Provisional Patent Application No. 63/240,151, filed Sep. 2, 2021, all of which are incorporated herein by reference.

BACKGROUND

This disclosure is directed towards lift arms. More specifically, the present disclosure is directed towards an electrically powered lift arm for a power machine that operates in whole or in part under electrical power.

Power machines, for the purposes of this disclosure, include any type of machine that generates power for the purpose of accomplishing a particular task or a variety of tasks. One type of power machine is a work vehicle. Work vehicles, such as loaders, are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Conventional power machines can include hydraulic systems and related components that are configured to use output from a power source (e.g., an internal combustion engine) to perform different work functions. More specifically, hydraulic motors may be configured to power movement of a power machine, and hydraulic actuators (e.g., hydraulic cylinders) may be used to move a lift arm structure attached to the power machine, to tilt or otherwise move an implement connected to the lift arm structure, or execute other operations.

The discussion above is merely provided for general background information and is not intended to be used as an aid in determining the scope of the claimed subject matter.

SUMMARY

Some examples of the present disclosure provide a power machine for movably operating an implement. The power machine can include a main frame (e.g., that supports an operator station) and a lift arm structure. The lift arm structure can include a lift arm extending along a lateral side of the frame. A proximal end of the lift arm can be movably secured to the frame at a rear portion of the frame. The power machine can further include an implement carrier movably secured to the distal end of the lift arm, and an electrical lift actuator.

In some cases, an electrical lift actuator can be secured at a first end to the rear portion of a frame and at a second end to a lift arm. The electrical lift actuator can be disposed within a lift actuator pocket defined by the frame and can be configured to be controllably extended and retracted to raise and lower the lift arm.

Some examples of the present disclosure provide a lift arm structure for a power machine with a frame. The lift arm structure can include a lift arm and an electrical lift actuator. The lift arm can be configured to be movably secured to the frame to extend along a lateral side of the frame.

In some cases, an electrical lift actuator can be secured to a lift arm within a pocket defined by the lift arm and can be configured to extend and retract between the lift arm and a frame of a power machine to raise and lower the lift arm. In some cases, an electrical lift actuator can be secured at a first end to a frame and at a second end to a main beam, within a pocket defined in the main beam.

Some examples of the present disclosure provide a lift arm structure for a power machine having a frame. The lift arm structure can include a main beam and a lift actuator. The main beam can extend along a lateral side of the power machine from a first end proximate a rear of the power machine to a second end proximate a front of the power machine.

Some examples of the present disclosure provide a power machine that can include a frame (e.g., that supports an operator station), a lift arm movably secured to the frame to extend along a lateral side of the frame, an electrical tilt actuator, an electrical lift actuator, and a power source that can be configured to power the electrical tilt actuator and the electrical lift actuator. The electrical tilt actuator can be secured to the lift arm and an implement carrier and can be configured to be controllably extended and retracted to change an attitude of an implement carrier. The electrical lift actuator can be secured at a first end to the frame (e.g., within a first pocket) and at a second end to the lift arm (e.g., within a second pocket), the electrical lift actuator, and can be configured to be controllably extended and retracted to raise and lower the lift arm.

Some examples of the present disclosure provide a power machine for movably operating an implement. The power machine can include a frame (e.g., that supports an operator station), a lift arm structure supported by the frame. The lift arm structure can include: a lift arm extending along a lateral side of the frame, with a proximal end of the lift arm movably secured to the frame at a rear portion of the frame; an implement carrier movably secured to the distal end of the lift arm; and an electrical lift actuator secured at a first end to the rear portion of the frame and at a second end to the lift arm, the electrical lift actuator being disposed within a lift actuator pocket defined by the frame and being configured to be controllably extended and retracted to raise and lower the lift arm. A motor end of the electrical lift actuator can be pivotally coupled to the frame at a first connection within the lift actuator pocket and an extendable end of the electrical lift actuator can extend out of the lift actuator pocket to pivotally couple with the lift arm at a second connection. At least one of the first connection or the second connection can be a clevis-joint connection.

In some examples, at all operational orientations of the lift arm, a motor of the electrical lift actuator can be located behind one or more of the first connection or the second connection, relative to a front-to-back direction of the power machine.

In some examples, the lift arm can define a lift arm axis corresponding to one or more of a neutral axis of a main beam of the lift arm, or a center line of the main beam of the lift arm. A rotational axis of the second connection can be disposed along or above the lift arm axis.

In some examples, a rotational axis of the second connection can be disposed closer to a top surface of the lift arm than to a bottom surface of the lift arm.

In some examples, the electric lift actuator can not extend below the lift actuator pocket.

In some examples, a bottom side of the lift actuator pocket can angle upward proximate the rear portion of the frame to provide a departure angle of at least 25 degrees.

In some examples, the second connection can be disposed rearward of a drive shaft of the loader.

In some examples, the lift arm can define a lift arm length between a rear pivotal connection to the frame and a front pivotal connection to the implement carrier. The second connection can be disposed along a rear half of the lift arm length.

In some examples, the second connection can be disposed along a rear third of the lift arm length.

In some examples, when the lift arm is in a fully lowered orientation, the second connection can be disposed rearward of an axle of a rearmost idler of a tractive element of the loader.

In some examples, the electrical lift actuator can have a fold-back motor configuration.

In some examples, each of the first and second connections can be a clevis-joint connection.

Some examples can provide a lift arm structure for a power machine with a frame. The lift arm structure can include: a lift arm configured to be movably secured to the frame to extend along a lateral side of the frame; and an electrical lift actuator secured to the lift arm within a pocket defined by the lift arm, the electrical lift actuator being configured to extend and retract between the lift arm and the frame of the power machine to raise and lower the lift arm. The electrical lift actuator can be rotatably secured to the lift arm with a pinned connection within the pocket, with the pinned connection defining an axis of rotation that can be on or above a centerline of the lift arm.

In some examples, the electrical lift actuator can be a ball screw actuator.

In some examples, the electrical lift actuator can have a fold-back motor configuration, with a motor that is behind a ball screw relative to a front-to-back direction of the power machine.

In some examples, the pinned connection within the pocket can be formed by a clevis-joint connection.

In some examples, the pocket can be defined as a recess that opens downwardly between side walls that extend downward from a main portion of lift arm and that includes a forward end and a rearward end. With the lift arm in a fully lowered configuration, the electrical lift actuator can extend within the pocket closer to the forward end than to the rearward end.

In some examples, at least a portion of the electrical lift actuator can be received within the pocket to be shielded on a laterally exterior side and a laterally interior side by the side walls.

Some examples can provide a power machine for movably operating an implement. The power machine can include a frame (e.g., that supports an operator station), a lift arm structure supported by the frame. The lift arm structure can include a lift arm, an implement carrier, and an electrical tilt actuator. The lift arm can extend along a lateral side of the frame, with a proximal end of the lift arm movably secured to the frame at a rear portion of the frame and a distal end of the lift arm including a tilt actuator pocket. The implement carrier can be movably secured to the distal end the lift arm. An electrical tilt actuator can be secured to the lift arm within the tilt actuator pocket, the electrical tilt actuator being configured to be controllably extended and retracted to change an attitude of the implement carrier.

In some examples, the electrical tilt actuator can be secured to the lift arm by a pinned connection within a proximal end of the tilt actuator pocket. In some examples, the pinned connection can be a clevis-joint connection.

In some examples, the tilt actuator pocket can support the electrical tilt actuator at least partly outboard of the operator station, in a lateral direction.

In some examples, electrical wires can be configured for providing electrical control and power signals. A first subset of electrical wires can extend through an interior volume of the lift arm to a connector for controlling and powering an implement, the connector being disposed at the distal end of the lift arm.

In some examples, the connector can be configured to receive electrical contacts at one or more of a top surface of the lift arm or a laterally exterior side of the lift arm.

In some examples, the tilt actuator pocket can include an interior opening that connects the interior volume of the lift arm with the tilt actuator pocket.

In some examples, the electrical tilt actuator can extend along a laterally exterior side of the lift arm.

In some examples, the electrical tilt actuator can be laterally aligned with a main beam of the lift arm.

In some examples, a portion of the electrical tilt actuator can extend to a laterally interior side of the main beam.

In some examples, a clevis-joint connection between the electrical tilt actuator and the lift arm can be aligned, in a front-to-back direction of the power machine, with a lateral side wall of the main beam.

In some examples, the tilt actuator pocket can be formed within a lower beam of the lift arm that can be coupled to and can extend downward from a main beam of the lift arm at the distal end of the lift arm. In some examples, the tilt actuator lower beam can include an inner leg and a lateral jog that connects the main beam with the inner leg. The electric tilt actuator can extend substantially along a laterally exterior side of the inner leg.

In some examples, at least part of a pivot joint between the electric tilt actuator and the lift arm can be laterally aligned with the main beam.

In some examples, the pivot joint between the electric tilt actuator and the lift arm can include a clevis-joint connection between the electrical tilt actuator and the lift arm within the tilt actuator pocket.

In some examples, at least a portion of the electrical tilt actuator can be received within the tilt actuator pocket to be shielded by the tilt actuator pocket on front, rear, top, laterally exterior, and laterally interior sides.

Some examples can provide a lift arm structure for a power machine with a frame. The lift arm structure can include a lift arm, an implement carrier, and an electrical tilt actuator secured to the lift arm. The lift arm can be configured to be movably secured to the frame to extend along a lateral side of the frame. The implement carrier can be movably secured to the lift arm. The electrical tilt actuator can be secured to the lift arm within a tilt actuator pocket defined by the lift arm, the tilt actuator pocket being disposed spaced apart from the implement carrier along a tilt-actuator portion of the lift arm that can extend between the implement carrier and a main portion of the lift arm, and the electrical tilt actuator being configured to be controllably extended and retracted to change an attitude of the implement carrier.

In some examples, the electrical tilt actuator can be a ball screw.

In some examples, the electrical tilt actuator can have a fold-back motor configuration.

In some examples, a motor end of the electrical tilt actuator can be secured to the lift arm with a pinned connection within the tilt actuator pocket, with a motor of the electrical tilt actuator extending rearward of an extendable portion of the electrical tilt actuator, within the tilt actuator pocket.

In some examples, the pinned connection to secure the electrical tilt actuator to the lift arm can be a clevis joint supported at opposing lateral sides of the tilt actuator pocket.

In some examples, a support plate of the clevis joint can extend proud of the tilt-actuator portion of the lift arm to a laterally interior side of the lift arm.

In some examples, the tilt actuator pocket can be a recess that opens downwardly and includes an internal taper toward an upper end of the recess, when the lift arm can be in a fully lowered position.

In some examples, at least a portion of the electrical tilt actuator can be received within the tilt actuator pocket to be shielded on a laterally exterior side, a laterally interior side, a front side, a rear side, and a top side.

In some examples, the electrical tilt actuator can be rotatably coupled to the lift arm by a pinned connection within the tilt actuator pocket.

Some examples can provide a lift arm structure for a power machine having a frame. The lift arm structure can include a main beam, a lower beam, and a tilt actuator. The main beam can extend along a lateral side of the power machine from a first end proximate a rear of the power machine to a second end proximate a front of the power machine. The lower beam can be coupled at a knee to the second end of the main beam, and can extend downwardly from the main beam to an implement carrier. The tilt actuator can be secured at a first end to the lower beam and at a second end to the implement carrier, can extend along a laterally exterior side of the lower beam and can be configured to extend and retract to change an attitude of the implement carrier relative to the lower beam.

In some examples, the tilt actuator can be an electrical tilt actuator.

In some examples, the tilt actuator can be secured within a tilt actuator pocket.

In some examples, the tilt actuator can be secured at the first end by a clevis-joint connection within the tilt actuator pocket.

In some examples, the lower beam can include an inner leg and an inward jog connecting the main beam with the inner leg so that the inner leg can be offset laterally inward from the main beam. The tilt actuator can extend substantially along a laterally exterior side of the inner leg, outside of the tilt actuator pocket.

Some examples can provide a power machine with a frame (e.g., that supports an operator station), a lift arm movably secured to the frame to extend along a lateral side of the frame, and an electrical tilt actuator, secured to the lift arm and an implement carrier. The electrical tilt actuator can be configured to be controllably extended and retracted to change an attitude of an implement carrier. An electrical lift actuator can be secured at a first end to the frame and at a second end to the lift arm, the electrical lift actuator being configured to be controllably extended and retracted to raise and lower the lift arm. A power source can be configured to power the electrical tilt actuator and the electrical lift actuator. The electrical tilt actuator can extend within a tilt actuator pocket defined by the lift arm proximate a front portion of the frame and can extend along a laterally exterior side of the lift arm.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION

Figure 1:
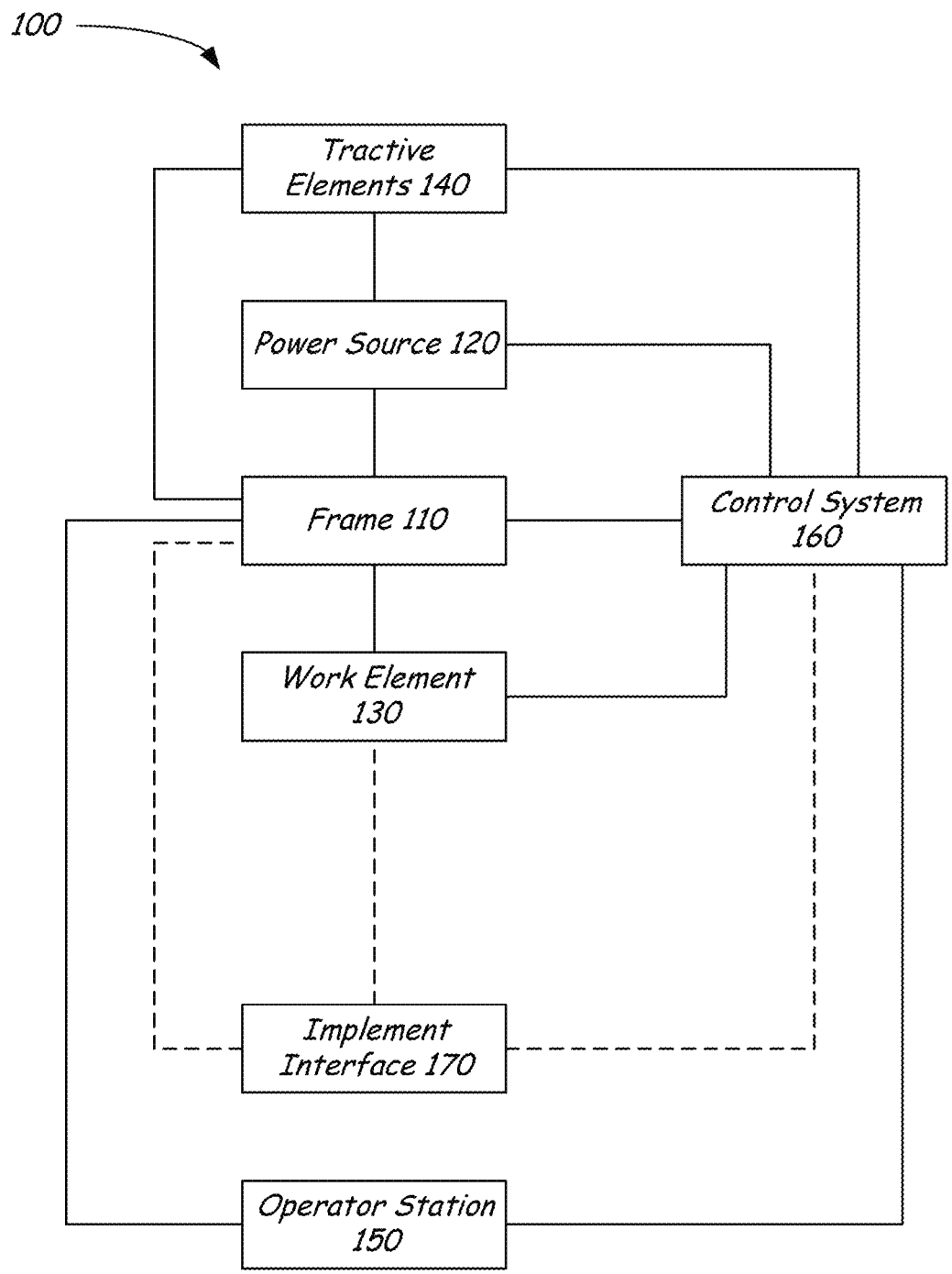
FIG. 1 is a block diagram illustrating functional systems of a representative power machine on which examples of the present disclosure can be advantageously practiced.

The concepts disclosed in this discussion are described and illustrated with reference to exemplary implementations. These concepts, however, are not limited in their application to the details of construction and the arrangement of components in the illustrative examples and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

As used herein in the context of a power machine, unless otherwise defined or limited, the term "lateral" refers to a direction that extends at least partly to a left or a right side of a front-to-back reference line defined by the power machine. Accordingly, for example, a lateral side wall of a cab of a power machine can be a left side wall or a right side wall of the cab, relative to a frame of reference of an operator who is within the cab or is otherwise oriented to operatively engage with controls of an operator station of the cab. Similarly, a "centerline" of a power machine refers to a reference line that extends in a front-to-back direction of a power machine, approximately halfway between opposing lateral sides of an outer spatial envelope of the power machine.

Also as used herein, unless otherwise defined or limited, the term "extends substantially along" (and the like) indicates that more than half of an elongate (or other maximum) length of the described component extends along a reference structure. In particular, a linear actuator that extends substantially along a particular structure can be viewed as extending along the structure in a direction of actuation of the actuator for more than half of an operationally fully retracted length of the linear actuator (e.g., 75% of the length, 95% of the length, etc.). Similarly, reference to "substantially all" of a length, width, or other dimension of a component indicates at least 90% of the dimension (e.g., 95%, 98%, 99%, 100%).

Also as used herein, unless otherwise defined or limited, two components or other elements that are described as "substantially aligned" overlap, relative to a particular reference direction (e.g., a front-to-back direction), across more than half of a dimension of at least one the components. Components that are described herein as "vertically aligned" are aligned at a common vertical distance from a common reference (e.g., two components, each having portions located at a particular height above a ground plane that is a defined by support surfaces of tractive elements of a power machine). Components that are described herein as "laterally aligned" are located at a common lateral distance from a common reference (e.g., a centerline of a power machine), on the same lateral side of a centerline of the power machine. Thus, for example, for an actuator that is substantially laterally aligned with a lift arm, at least half of a lateral width of the actuator is spaced from a centerline of the relevant power machine at a common lateral distance (or range of lateral distances) as a corresponding portion of the lift arm. Or, in other words, as viewed from a front-to-back elevation view or a top-to-bottom plan view, at least half of the lateral width of the actuator overlaps relative to a lateral direction with the relevant portion of the lift arm As another example, for an actuator that is vertically aligned with a reference line (or corresponding plane) at a particular front-to-back location, at least part of the actuator (e.g., a pivot connection point thereof) is located at a common vertical height with the reference line at the particular front-to-back location (e.g., a pivot connection point of an actuator is on a reference line).

While the power machines disclosed herein may be embodied in many different forms, several specific examples are discussed herein with the understanding that the examples described in the present invention are to be considered only exemplifications of the principles described herein, and the invention is not intended to be limited to the examples illustrated. Throughout the disclosure, the terms "about" and "approximately" mean plus or minus 5% of the number that each term precedes, unless otherwise specified.

Some discussion below describes improved components and configurations for power machines, including components and configurations that use electrical (e.g., as opposed to hydraulic) power to operate certain power machine components or otherwise implement certain power machine functionality. In some examples, electrically powered components can be mounted to a frame of a power machine to selectively move work elements of the power machine, including lift arms or implement carriers. In some examples, electrically powered components can provide motive power for a power machine, including for tracked power machines (e.g., compact tracked loaders).

Correspondingly, some examples can provide improvements over conventional power machines, including power machines that use hydraulic components for certain operations. For example, use of electrical components (e.g., motors and actuators) to execute particular functions, instead of conventional hydraulic components, can improve overall precision, control, and speed of certain power machine operations. Further, the use of electrical components can also reduce overall component size, potential for failure, and general maintenance requirements as compared to conventional hydraulic systems. However, some aspects of the technology disclosed below can be advantageously employed in power machines for which some (or all) of the relevant components are hydraulically operated.

Continuing, some examples can provide improved structural arrangements for power machine actuators, and electrical components (e.g., motors and other actuators) in particular. For example, some implementations can include lifts arms with tilt actuators (including any associated motors) that are in at least partial alignment, in a front-to-back direction, with a main portion of the lift arm, rather than being positioned entirely to a laterally interior side of the lift arm. In some examples, tilt actuators can be positioned to extend along laterally exterior portions of a lift arm. In some cases, these types of arrangement can allow the tilt actuators to be mounted so as to increase operator visibility and case of access (e.g., providing additional space around a cab for operator egress and ingress).

Relatedly, some examples can provide structural advantages for supporting, maintaining, and operating actuators and other components. For example, some implementations can include lift arms with pockets (e.g., with metal panel housings) that can at least partly enclose associated actuators. For some such configurations, the tilt actuator pockets can additionally provide stable and robust support for pinned (or other) connections as can support particularly stable operation of tilt (or other) actuators. Further, in some cases, the tilt actuator pockets can at least partly shield the tilt actuators from debris or undesired contact, while also allowing for easy access to the tilt actuators for maintenance. Moreover, in some cases, the shape of lift arms (e.g., exterior profiles of tilt actuator pockets) can be configured to improve visibility of an attached implement for an operator. Thus, for example, exterior walls of tilt actuator pockets may be oriented so as to improve forward visibility while still providing appropriate support for a tilt actuator.

Additionally, some examples can include power assemblies that can provide improved accessibility, power routing, or weight distribution relative to conventional designs. For example, some implementations can include electrical systems with control or power wiring that is efficiently routed through structural features of a power machine, including side walls of a housing for an actuator and within lift arms or other structures. Further, electrical connectors (e.g., an electrical connector for a powered implement) can be provided on a top or an outboard side of a housing having a pocket for an actuator. In some cases, these and similar arrangements can provide for efficient installation and signal routing, and can also help to protect signal lines (e.g., lines for power or control) from pinch points or adverse contact.

Other benefits will also be apparent from the discussion below, including benefits relating to the orientation of traction motors, to control of actuators and attachment mechanisms (e.g., for implements), and to spatial considerations (e.g., relative to clearance for operator stations).

Figure 2:
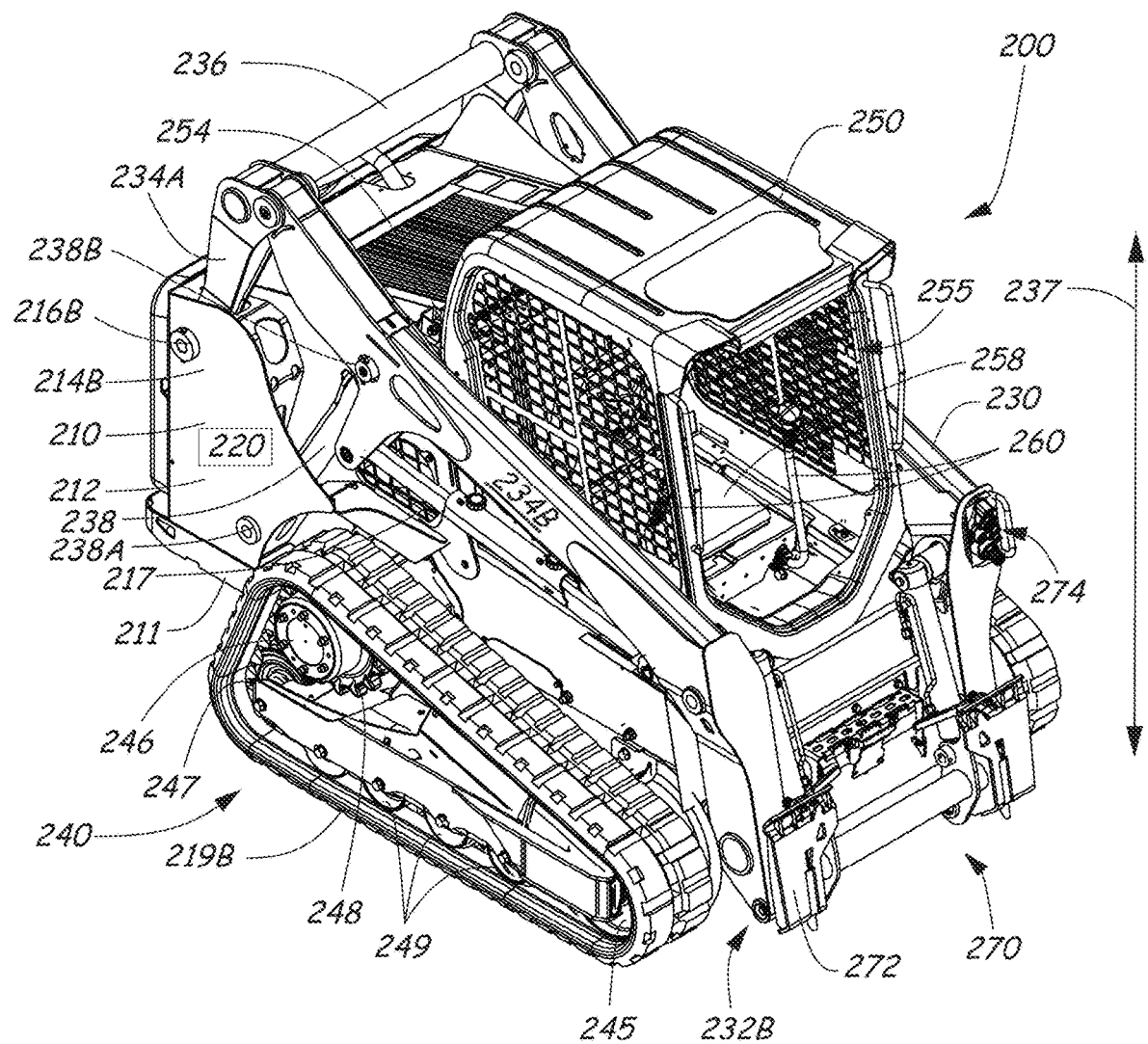
FIG. 2 is a perspective view showing generally a front of a power machine on which examples disclosed in this specification can be advantageously practiced.
Figure 3:
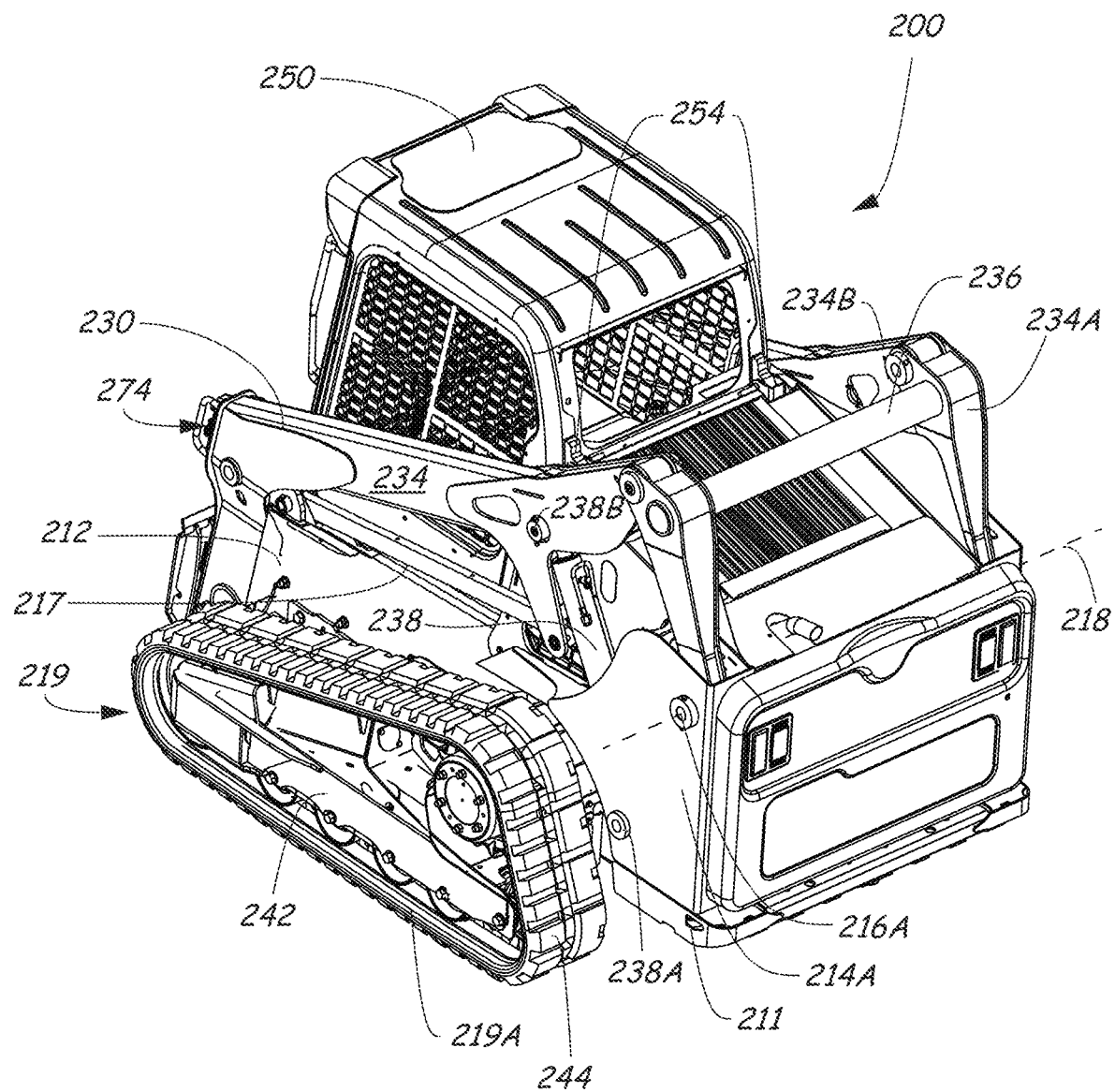
FIG. 3 is a perspective view showing generally a back of the power machine shown in FIG. 2.

These concepts can be practiced on various power machines, as will be described below. A representative power machine on which the examples can be practiced is illustrated in diagram form in FIG. 1 and one example of such a power machine is illustrated in FIGS. 2-3 and described below before any embodiments are disclosed. For the sake of brevity, only one power machine is discussed. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

The embodiments of the disclosure are presented below in the context of compact tracked loaders, with electrical components and other relevant components arranged on and secured to a frame. In some embodiments, electrical components and related systems according to the disclosure can be used with other types of power machines, including with articulated power machines and with non-articulated power machines with tractive elements other than tracks (i.e., wheels). In addition, some embodiments of the disclosure are presented in the context of electrical sub-assemblies for controlling work functions, such as by controlling actuators to maneuver one or more implements. In some embodiments, electrical sub-assemblies according to the disclosure can also be configured for other uses, such as to control other features, actuations, or movements of power machines.

FIG. 1 illustrates a block diagram that illustrates the basic systems of a power machine 100 upon which the embodiments discussed below can be advantageously incorporated and can be any of a number of different types of power machines. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because the power machine 100 shown in FIG. 1 is a self-propelled work vehicle, it also has tractive elements 140, which are themselves work elements provided to move the power machine over a support surface, and an operator station 150 that provides an operating position for controlling the work elements of the power machine. A control system 160 is provided to interact with the other systems to perform various work tasks at least in part in response to control signals provided by an operator.

Certain work vehicles have work elements that are capable of performing a dedicated task. For example, some work vehicles have a lift arm to which an implement such as a bucket is attached such as by a pinning arrangement. The work element, i.e., the lift arm, can be manipulated to position the implement for the purpose of performing the task. The implement, in some instances, can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e., not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines can have at least one portion that is capable of moving with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is capable of providing power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that are capable of using it to perform a work function. Power sources for power machines typically include an engine such as an internal combustion engine and a power conversion system such as a mechanical transmission or a hydraulic system that is capable of converting the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, wheels attached to an axle, track assemblies, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e., from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e., remote from both of the power machine and any implement to which is it coupled) that is capable of controlling at least some of the operator controlled functions on the power machine.

FIGS. 2-3 illustrates a loader 200, which is one particular example of a power machine of the type illustrated in FIG. 1 where the embodiments discussed below can be advantageously employed. Loader 200 is a track loader and more particularly, a compact tracked loader. A track loader is a loader that has endless tracks as tractive elements (as opposed to wheels). Track loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Track loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the track loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Frame 210 also supports a work element in the form of a lift arm structure 230 that is powered by the power system 220 and can perform various work tasks. As loader 200 is a work vehicle, frame 210 also supports a traction system 240, which is also powered by power system 220 and can propel the power machine over a support surface. The lift arm structure 230 in turn supports an implement carrier 272, which can receive and secure various implements to the loader 200 for performing various work tasks. The loader 200 can be operated from an operator station 255 from which an operator can manipulate various control devices to cause the power machine to perform various functions. A control system 260 is provided for controlling the various functions of the loader 200.

Various power machines that can include and/or interacting with the embodiments discussed below can have various different frame components that support various work elements. The elements of frame 210 discussed herein are provided for illustrative purposes and should not be considered to be the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200 is attached to the undercarriage 211 such as with fasteners or by welding the undercarriage to the mainframe. Mainframe 212 includes a pair of upright portions 214 located on either side and toward the rear of the mainframe (only one is shown in FIG. 2) that support a lift arm structure 230 and to which the lift arm structure 230 is pivotally attached. The lift arm structure 230 is illustratively pinned to each of the upright portions 214. The combination of mounting features on the upright portions 214 and the lift arm structure 230 and mounting hardware (including pins used to pin the lift arm structure to the mainframe 212) are collectively referred to as joints 216 (one is located on each of the upright portions 214) for the purposes of this discussion. Joints 216 are aligned along an axis 218 so that the lift arm structure is capable of pivoting, as discussed below, with respect to the frame 210 about axis 218. Other power machines may not include upright portions on either side of the frame or may not have a lift arm structure that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements 242 on either side of the loader 200 (only one is shown in FIG. 2), which on loader 200 are track assemblies.

The lift arm structure 230 shown in FIG. 1 is one example of many different types of lift arm structures that can be attached to a power machine such as loader 200 or other power machines on which embodiments of the present discussion can be practiced. The lift arm structure 230 has a pair of lift arms 232 that are disposed on opposing sides of the frame 210. A first end 232A of each of the lift arms 232 is pivotally coupled to the power machine at joints 216 and a second end 232B of each of the lift arms is positioned forward of the frame 210 when in a lowered position as shown in FIG. 2. The lift arm structure 230 is movable (i.e., the lift arm structure can be raised and lowered) under control of the loader 200 with respect to the frame 210. That movement (i.e., the raising and lowering of the lift arm structure 230) is described by a travel path, shown generally by arrow 233. For the purposes of this discussion, the travel path 233 of the lift arm structure 230 is defined by the path of movement of the second end 232B of the lift arm structure.

Each of the lift arms 232 of lift arm structure 230 as shown in FIG. 2 includes a first portion 234A and a second portion 234B that is pivotally coupled to the first portion 234A. The first portion 234A of each lift arm 234 is pivotally coupled to the frame 210 at one of the joints 216 and the second portion 234B extends from its connection to the first portion 234A to the second end 232B of the lift arm structure 230. The lift arms 232 are each coupled to a cross member 236 that is attached to the first portions 234A. Cross member 236 provides increased structural stability to the lift arm structure 230. A pair of actuators 238 (only one is shown in FIG. 1), which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The tilt actuators 238 are sometimes referred to individually and collectively as lift cylinders. Actuation (i.e., extension and retraction) of the tilt actuators 238 cause the lift arm structure 230 to pivot about joints 216 and thereby be raised and lowered along a fixed path illustrated by arrow 233. Each of a pair of control links 217 (only one is shown) are pivotally mounted to the frame 210 and one of the lift arms 232 on either side of the frame 210. The control links 217 help to define the fixed travel path of the lift arm structure 230. The lift arm structure 230 shown in FIG. 2 is representative of one type of lift arm structure that may be coupled to the power machine 100. Other lift arm structures, with different geometries, components, and arrangements can be pivotally coupled to the loader 200 or other power machines upon which the embodiments discussed herein can be practiced without departing from the scope of the present discussion. For example, other machines can have lift arm structures with lift arms that each has one portion (as opposed to the two portions 234A and 234B of lift arm 234) that is pivotally coupled to a frame at one end with the other end being positioned in front of the frame. Other lift arm structures can have an extendable or telescoping lift arm. Still other lift arm structures can have several (i.e., more than two) portions segments or portions. Some lift arms, most notably lift arms on excavators but also possible on loaders, may have portions that are controllable to pivot with respect to another segment instead of moving in concert (i.e., along a pre-determined path) as is the case in the lift arm structure 230 shown in FIG. 2. Some power machines have lift arm structures with a single lift arm, such as is known in excavators or even some loaders and other power machines. Other power machines can have a plurality of lift arm structures, each being independent of the other(s).

An exemplary implement interface 270 is provided at a second end 234B of the lift arm 234. The implement interface 270 includes an implement carrier 272 that is capable of accepting and securing a variety of different implements to the lift arm structure 230. Such implements have a machine interface that is configured to be engaged with the implement carrier 272. The implement carrier 272 is pivotally mounted to the second end 234B of the lift arm 234. Implement carrier actuators (e.g., tilt actuators) are operably coupled between second end 232B of the lift arm structure 230 and the implement carrier 272 and are operable to rotate the implement carrier with respect to the lift arm structure 230.

The implement interface 270 also includes an implement power source 235 available for connection to an implement on the lift arm structure 230. The implement power source 235 includes pressurized hydraulic fluid port to which an implement can be coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The electrical power source 235 also exemplarily includes electrical conduits that are in communication with a data bus on the loader 200 to allow communication between a controller on an implement and electronic devices on the loader 200. It should be noted that the specific implement power source on loader 200 does not include an electrical power source.

The lower frame 211 supports and has attached to it the pair of tractive elements 242, identified in FIGS. 2-3 as left track assembly 240A and right track assembly 240B. Each of the tractive elements 242 has a track frame 243 that is coupled to the lower frame 211. The track frame 243 supports and is surrounded by an endless track 244, which rotates under power to propel the loader 200 over a support surface. Various elements are coupled to or otherwise supported by the track frame 243 for engaging and supporting the endless track 244 and cause it to rotate about the track frame. For example, a sprocket 246 is supported by the track frame 243 and engages the endless track 244 to cause the endless track to rotate about the track frame. An idler 245 is held against the track 244 by a tensioner (not shown) to maintain proper tension on the track. The track frame 243 also supports a plurality of rollers 248, which engage the track and, through the track, the support surface to support and distribute the weight of the loader 200.

Upper frame portion 212 supports cab 250, which defines, at least in part, operator compartment or station 255. A seat 258 is provided within the cab 250 in which an operator can be seated while operating the power machine. While sitting in the seat 258, an operator will have access to a plurality of operator input devices of the control system 260 (e.g., joysticks) that the operator can manipulate to control various work functions, such as manipulating the lift arm structure 230, the traction system 240, and so forth.

Display devices are provided in the cab to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to providing dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided.

Figure 4:
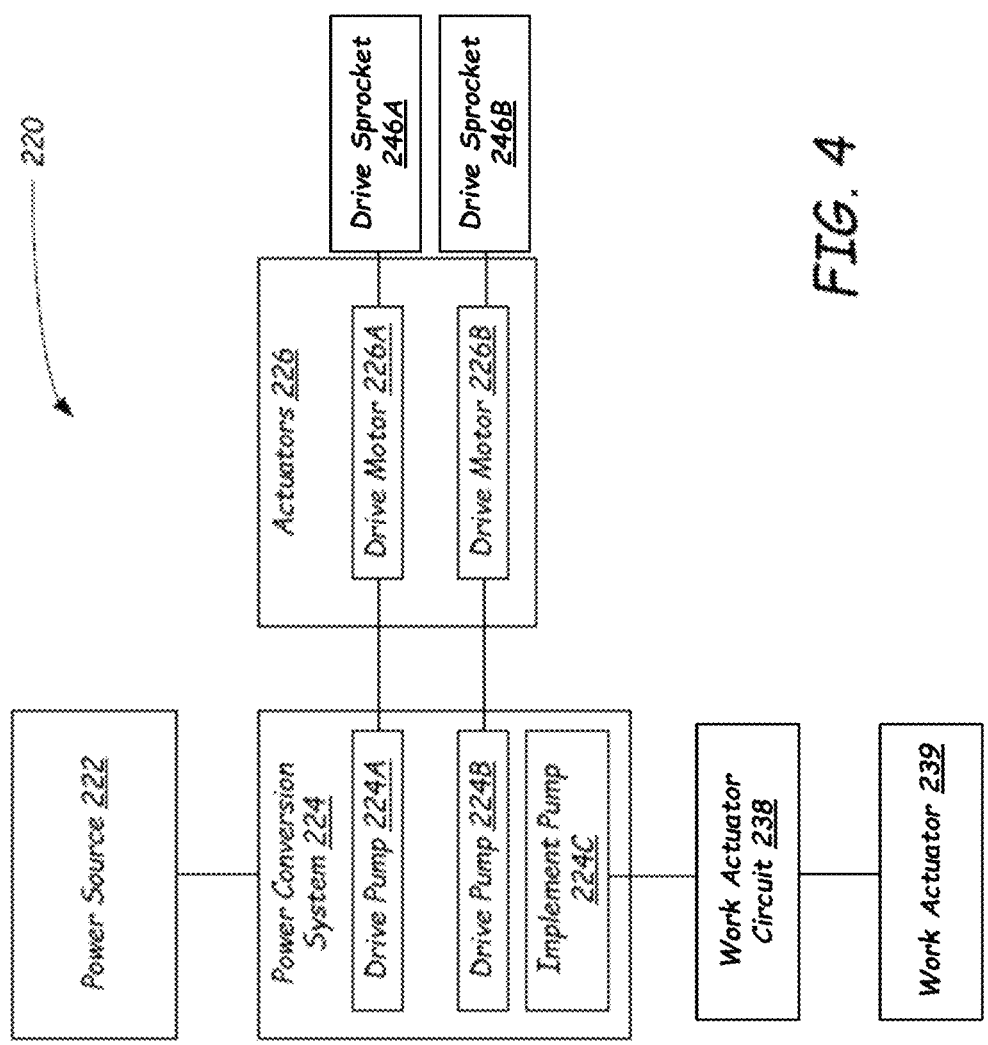
FIG. 4 is a block diagram illustrating components of a power system of a loader such as the loader of FIGS. 2 and 3.

FIG. 4 illustrates power system 220 in more detail. Broadly speaking, power system 220 includes one or more power sources 222 that can generate and/or store power for operating various machine functions. On loader 200, the power system 220 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine. Power conversion systems in various power machines can include various components, including mechanical transmissions, hydraulic systems, and the like. In some cases, the power conversion system 224 of power machine 200 includes a hydrostatic drive pump 224A, which provides a power signal to drive motors 226A, 226B, 226C and 226D. The four drive motors 226A, 226B, 226C and 226D, in turn, are each operably coupled to four axles, 228A, 228B, 228C and 228D, respectively. Although not shown, the four axles are coupled to the wheels 242A, 242B, 244A, and 244B, respectively. The hydrostatic drive pump 224A can be mechanically, hydraulically, and/or electrically coupled to operator input devices to receive actuation signals for controlling the drive pump. The power conversion system also includes an implement pump 224B, which is also driven by the power source 222. The implement pump 224B is configured to provide pressurized hydraulic fluid to a work actuator circuit 237. Work actuator circuit 237 is in communication with work actuator 239. Work actuator 239 is representative of a plurality of actuators, including the lift cylinder, tilt cylinder, telescoping cylinder, and the like. The work actuator circuit 237 can include valves and other devices to selectively provide pressurized hydraulic fluid to the various work actuators represented by block 239 in FIG. 4. In addition, the work actuator circuit 237 can be configured to provide pressurized hydraulic fluid to work actuators on an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

In conventional arrangements, the tilt actuators 238 may use hydraulic components (i.e., hydraulic actuators or motors), which can result in certain inefficiencies. For example, the use of hydraulic actuators may result in somewhat imprecise execution of certain operations, may require frequent maintenance and related activities (e.g., to address leakage of hydraulic fluid, wear of seals, etc.), may impose undesired size requirements, and may exhibit limited performance capabilities (e.g., relative to actuation speed, responsiveness to operator commands or external factors, etc.). Complex control of hydraulic actuators may also be difficult, including for synchronized operation of the tilt actuators and associated power machine work elements. Thus, although conventional power machines that use hydraulic actuators can provide substantial power and functionality, including for motive power and to operate lift arms and implements, optimal performance relative to multiple design constraints may be difficult to achieve.

Embodiments of the disclosure can address one or more of the issues noted above, or others. For example, some implementations can use electrical systems for motive power or for other operation of work elements, including lift arm structures and implements. In some embodiments, such electrical systems can be readily swapped for hydraulic systems on pre-existing power machine structures, such as by replacing hydraulic cylinders and motors with electrical actuators and motors, thereby potentially improving multiple aspects of machine performance with little or no required adaptation of existing power machine frames or other support structures.

As also noted above, the use of electrical components in some embodiments (e.g., instead of hydraulic components) can help to improve overall system functionality, including relative to precision and complexity of control for work elements. For example, electrical actuators can generally provide enhanced motion-control capabilities as compared to hydraulic actuators, including with regard to precise positioning of components (e.g., precise extension of lift or tilt actuators) and complex simultaneous control of multiple electrical components (e.g., simultaneous control of multiple drive motors or work actuators). Use of electrical components can also help to reduce maintenance frequency and diminish potential for component failures, including through the elimination of hydraulic leakage and of components that are prone to substantial wear (e.g., seals). As a result, using electrical systems as opposed to hydraulic systems can reduce the overall cost and time required to maintain power machines. Moreover, in some instances, hydraulic systems require more components and space than comparably capable electrical systems. As a result, using electrical systems as opposed to hydraulic systems can reduce the required spatial footprint on a power machine for these systems, with corresponding benefits for overall system design. For example, power machines that extensively use electrical systems rather than hydraulic systems can be more compact or more accessible for users, or can be more easily equipped with additional components for enhanced functionality.

As another issue, including for power machines with electrical actuators, conventional lift arm designs may present obstructions to visibility for operators, may be subject to inefficient loading or stress distributions during use, and may be somewhat exposed to environmental objects and debris, in addition to presenting significant packaging challenges relative to other components of a power machine. Some embodiments presented herein can provide improved lift arm structures, including as may collectively address the issues noted above. In some cases, the improved lift arm structures may be particularly beneficial for use with electrical actuators (e.g., electrical tilt actuators) to provide improved loading, shielding, visibility, and overall packaging.

Figure 5:
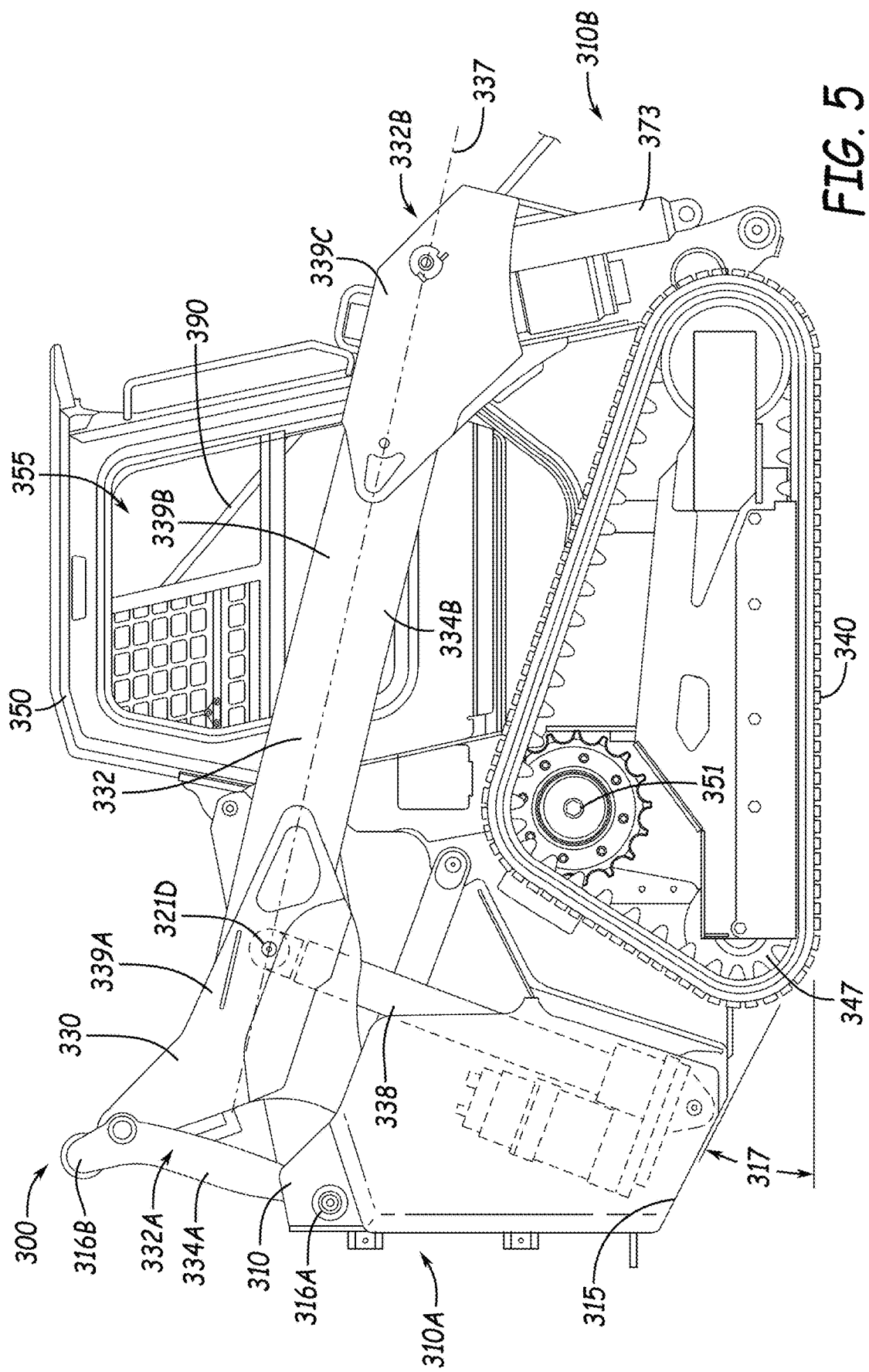
FIG. 5 is a side plan view showing certain components a power machine in the form of an electrically powered compact tracked loader according to examples of the disclosure.
Figure 6:
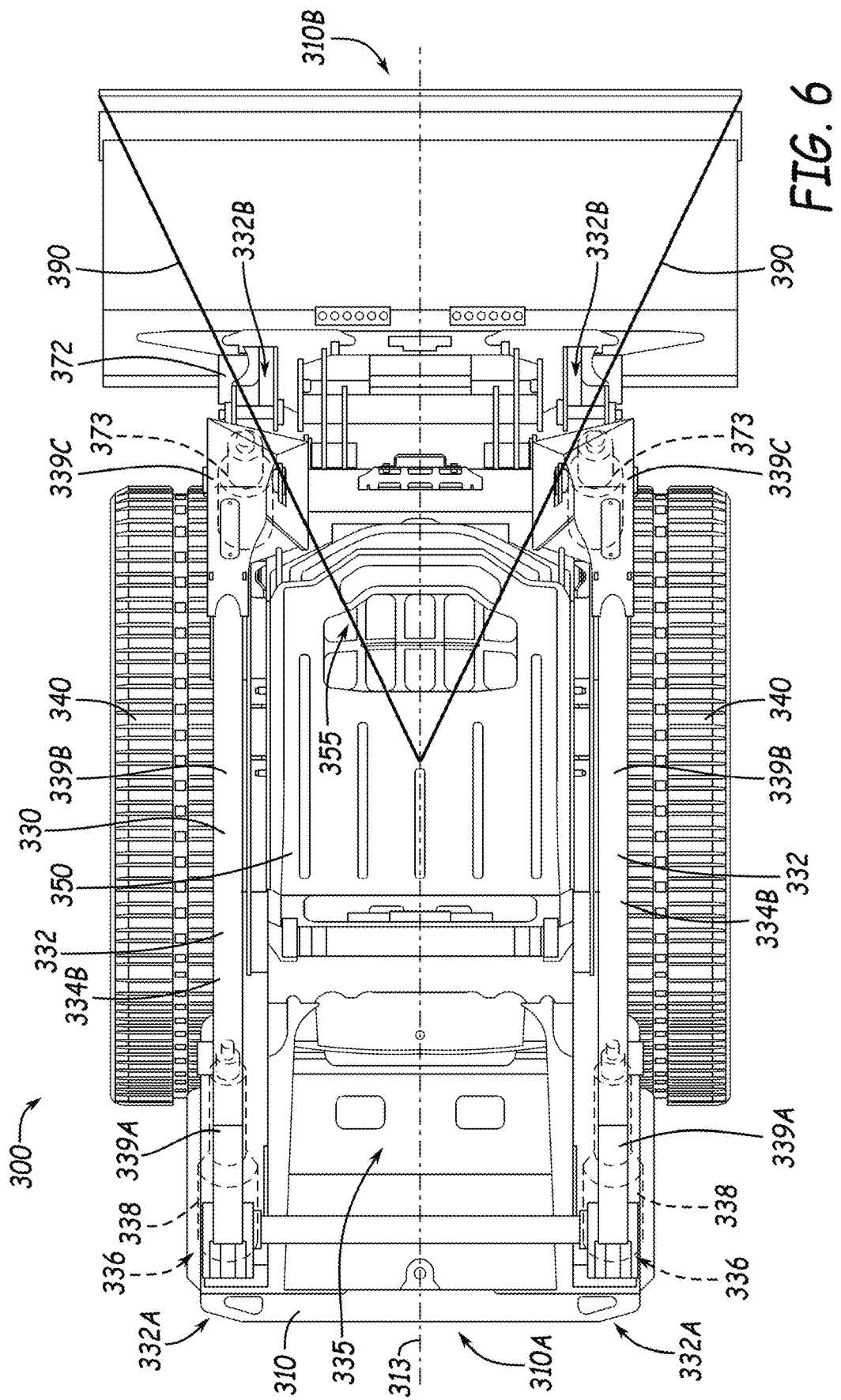
FIG. 6 is a top plan view of the power machine of FIG. 5, with tilt and lift actuators shown in phantom.

FIGS. 5 and 6 illustrate an example arrangement of components for an electrically powered power machine 300, which is one particular example of the power machine 100 illustrated broadly in FIG. 1 and discussed above, and relative to which the embodiments discussed herein can be advantageously employed. The power machine 300 is similar in some ways to the loader 200 described above and like numbers represent similar parts unless otherwise indicated below. For example, like the loader 200, the power machine 300 includes a frame 310, a lift arm structure 330, and a traction system 340.

As shown in FIGS. 5 and 6, the frame 310 is substantially similar to the frame 210 of the power machine 200, although the specific elements of the frame 310 discussed herein are provided for illustrative purposes and are not intended to represent the only type of frame for a power machine on which the embodiments of this disclosure can be used. Generally, the frame 310 includes a rear frame end 310A opposite a front frame end 310B and is generally symmetrical about a longitudinal plane 313 (e.g., a central vertical plane of the power machine 300). The frame 310 is configured to support a cab 350 that is similar to the cab 250 of power machine 200 and can correspondingly include an operator station 355 from which an operator can manipulate various control devices (i.e., an operator control system) to cause the power machine 300 to perform various work functions. Similar to the operator station 255 (see FIG. 2), the operator station 355 can include an operator seat and a plurality of operator input devices, for example, a joystick, although other operator input devices can include other control levers or other devices of known configurations that an operator can manipulate to control various machine functions.

The frame 310 is also configured to operatively support the lift structure 330. In the illustrated embodiment, the lift arm structure 330 includes two lift arms 332 that are symmetrically configured on opposing lateral sides of the frame 310 (e.g., on opposing sides of the longitudinal plane 313). Accordingly, discussion of one of the lift arms 332 herein generally applies to the other of the lift arms 332. In some embodiments, a different number of lift arms (e.g., only one lift arm) may be provided, or lift arms may not be symmetrically configured.

As illustrated in FIG. 5 in particular, the lift arm 332 extends between a proximal end 332A (e.g., a first end) located near the rear end 310A of the frame 310 and a distal end 310B (e.g., a second end) located near the front end 310B of the frame 310. Put another way, the first end 332A of the lift arm 332 is disposed closer to the rear end 310A of the frame 310 than to the front end 310B of the frame 310 and the second end 332B of the lift arm 332 is disposed closer to the front end 310B of the frame 310 than to the rear end 310A of the frame 310. Additionally, the lift arm 332 generally includes a first portion 334A that is pivotally coupled to the frame 310 at a joint 316A and a second portion 334B that extends from a pivotal connection to the first portion 234A at joint 316B toward the second end 232B of the lift arm structure 230. Thus, the lift structure 330 is generally configured to operate as a vertical path lift structure that can raise and lower an implement along a non-radial path. In other embodiments, other configurations (e.g., other linkage arrangements) can be used, or a lift structure may be configured to operate as a radial path lift structure.

A second (e.g., distal) portion of a lift arm can be configured as a generally elongate member that can made of one or more sections. For example, in the illustrated embodiment, the second portion 334B of the lift arm 332 includes three sections that are fixedly coupled together to form a main beam of the lift arm 332, namely, a first or rear beam portion 339A, a second or middle beam portion 339B, and a third or front beam portion 339C. The first beam portion 339A is disposed near the rear end 310A of the frame 310 and includes the joint 316B so that the first beam portion 339A is coupled to the first portion 334A of the lift arm 332. The first beam portion 339A is also fixedly coupled to (e.g., welded to or integrally formed with) the second beam portion 339B opposite the joint 316B. The second beam portion 339B extends generally toward the front end 310B of the frame 310, from its connection with the first beam portion 339A, to connect with the third beam portion 339C proximate the front end 310B of the frame 310. As illustrated, the second beam portion 339B is configured as a generally straight, generally hollow beam, but other embodiments may include various bends or other features and geometries. The third beam portion 339C is fixedly coupled (e.g., welded) to the second beam portion 339B near the front end 310B of the frame 310, and is configured to support a work element.

Figure 8:
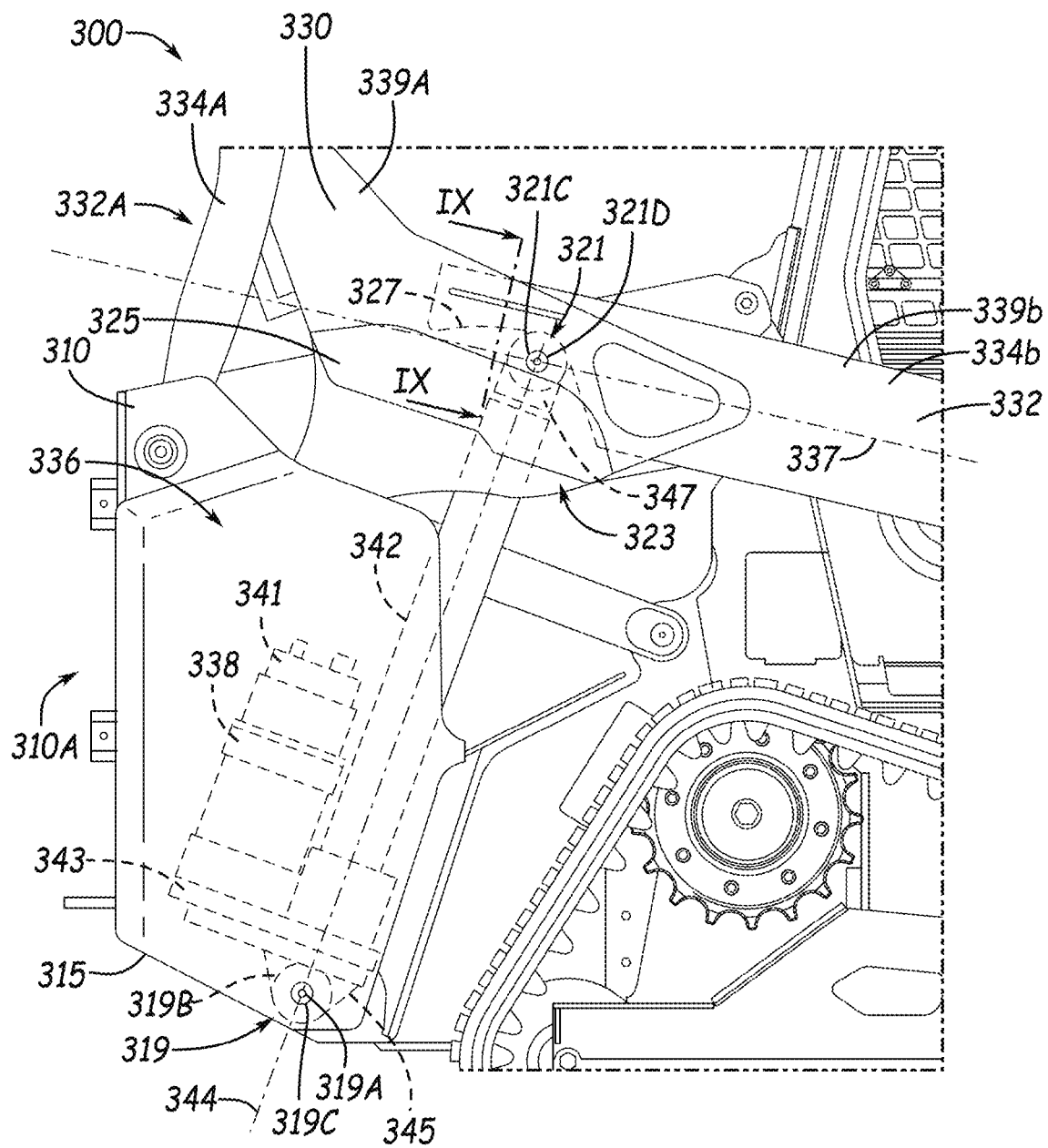
FIG. 8 is a is a side plan partial view of a rear end of the power machine of FIG. 5, including the lift actuator of FIG. 7.

In general, a lift arm can define a lift arm axis that extends generally along a main beam or main section of the lift arm, from a rear end of the lift arm to a front end of the lift arm. For example, as illustrated in FIGS. 5 and 8, the second beam portion 339B defines a neutral (e.g., central or centroid) axis 337 of the second portion 334B (and of the lift arm 332, generally), which runs centrally along the length of the second portion 334B (i.e., along a length taken between the first beam portion 339A and the third beam portion 339C). In other embodiments, where a main beam of a lift arm is curved, the neutral axis can be correspondingly curved to follow along a local center or centroid of the lift arm. In yet other embodiments, the lift arm axis can be defined in other ways. For example, a lift arm axis can be defined as a center line that follows local midpoints between upper and lower edges of a main beam of a lift arm for a length of the main beam.

With continued reference to FIGS. 5 and 6, the frame 310 can also be configured to support a variety of other components. For example, similar to the frame 210 of power machine 200, the frame 310 supports a power source 335 (see FIG. 6) that is configured to provide power for executing functions on the power machine 300, including operations using the traction system 340 and the lift arm structure 330. In the illustrated embodiment, the power source 335 is an electrical power source (e.g., a battery) that provides electrical power for operation of the traction system 340, the lift arm structure 330, and other subsystems of the power machine 300. The power source 335 can include a control module (not shown) configured to control the distribution of electrical power to other electrical devices of the power machine 300, including motors, linear actuators, and various work elements, as further discussed below. Further, in some embodiments, a control module can be configured to receive signals from other electrical devices, to allow feedback-based or other control of various devices or the power machine 300 in general.

As generally discussed above, electrical actuators can be usefully employed for non-tractive operations of a work machine. However, in some cases, size and other constraints that are inherent to certain electrical actuators may increase the difficulty of providing optimal physical reach, mechanical advantage, rear visibility, etc. for a lift arm assembly. For example, electrical actuators tend to be longer than hydraulic actuators with similar capacity or capabilities, with increased dead-band length (i.e., the part of overall actuator length that exceeds the length by which the actuator can be extended). Some embodiments of the disclosed technology can address this issue, including by improving the mounting locations and other aspects of mounting configuration for electrical lift actuators. For example, some implementations can use clevis-type connections alone or in combination with fold-back motor configurations or improved mounting locations on a main frame or a lift arm to generally improve packaging and performance for electrically actuated lift arms.

For example, with continued reference to FIGS. 5 and 6, electrically powered lift actuators 338 and electrically powered tilt actuators 373 can be used to execute various functions with the lift arm structure 330. In the illustrated embodiment, the lift actuators 338 and the tilt actuators 373 are supported on opposing lateral sides of the frame 310 so as to be substantially symmetrical about the longitudinal plane 313 of the power machine 300. Accordingly, discussion of one of the lift actuators 338 or one of the tilt actuators 373 herein generally also applies to the other of the respective lift actuators 338 and tilt actuators 373. In other embodiments, different numbers of lift actuators and/or tilt actuators may be provided, or they may not be symmetrically configured.

Figure 7:
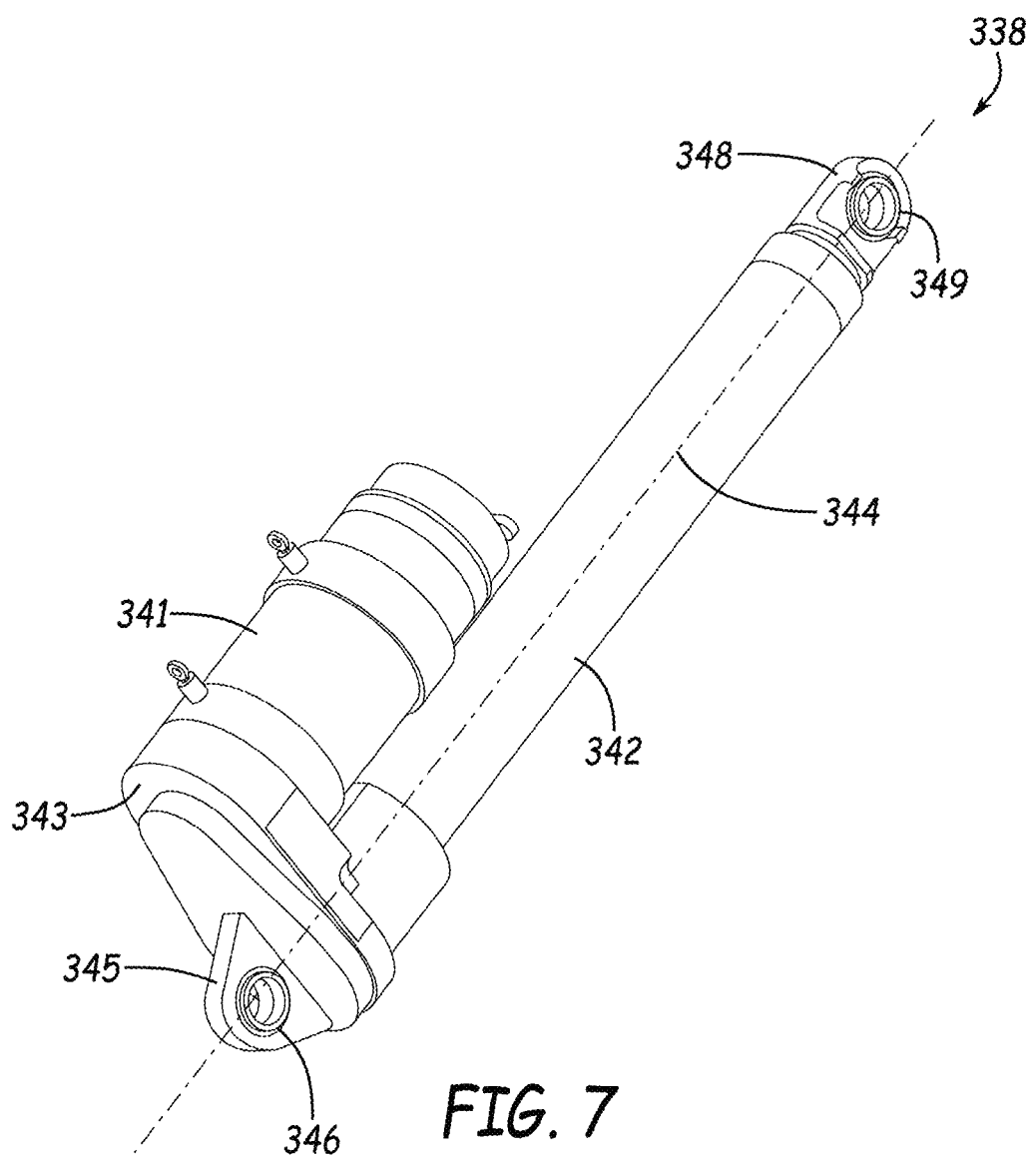
FIG. 7 is perspective view of an example lift actuator in the form of an electrically powered ball screw actuator in a fold-back, clevis-joint configuration according to examples of the disclosure.

With additional reference to FIG. 7, an example configuration of the lift actuator 338 is shown in greater detail. As illustrated, the lift actuator 338 is configured as an electrically powered ball screw actuator that can be controllably extended (e.g., by an operator via a control module) to raise and lower the lift arm 332 along a travel path (e.g., similar to the travel path 233 as shown in FIG. 2). The lift actuator 338 includes an electrical motor 341 and an extendable portion configured as a ball screw 342, which are operatively connected to one another via a gearbox 343. More specifically, the lift actuator 338 is in a fold-back motor configuration wherein each respective motor 341 and ball screw 342 extend parallel to one another from the same side of the gearbox 343. That is, the ball screw 342 extends away from the gearbox 343 to define an extension axis 344 of the lift actuator 338, and the motor 341 extends parallel to and in the same direction as the extension axis 344. The ball screw 342 is configured to linearly extend and retract along the extension axis 344 when powered by the motor 341 via the gearbox 343.

Although ball screws and fold-back motor configurations may be particularly beneficial relative to lift arm structures discussed herein, in other embodiments, other configurations are possible. For example, a lift actuator can be another type of electrical actuator, including a lead screw, belt driven, or other geared actuator, or can include with motors with in-line or perpendicular configurations.

As also discussed below, a lift actuator can further include one or more mounting features (i.e., connection structures) to pivotally secure and operatively couple the lift actuator between, for example, a frame and a lift arm of a power machine. Although a lift actuator can include various types of connection structures, some arrangements may provide particular stability and utility for electrical actuators, including when implemented in combination with other principles discussed herein. For example, as illustrated in FIG. 7, the lift actuator 338 includes an upright flange 345 (e.g., similar to a pillow block structure) coupled with and extending from the gearbox 343 opposite the motor 341 and the screw 342.

The flange 345 is stationary relative to the gearbox 343 and is configured to receive a bushing or a bearing 346 that is configured to rotatably couple with, for example, the frame 310.

In some cases, the flange 345 can be configured so that the bearing 346 is substantially aligned with the extension axis 344. In some cases, the flange 345 may be removably coupled or integrally formed with the gearbox 343. Further, in the illustrated embodiment, the bearing 346 is configured as a spherical bearing that can allow for more axial displacement (i.e., misalignment) than other conventional approaches, and can help to prevent induced side-loading on the body of an associated actuator. In some embodiments, other types of bearings and bushings may also be used.

The lift actuator 338 further includes an extendable end 348 that can be extended and retracted with the ball screw 342 to move linearly relative to the gearbox 343. In the illustrated example, the extendable end 348 has a spherical bearing 349 that is configured to rotatably couple with, for example, the lift arm 332, although other types of ends, bearings, and/or bushings may also be used. The bearing 349 is configured similarly to the bearing 346 in the illustrated embodiment, although other configurations are possible.

Figure 9:
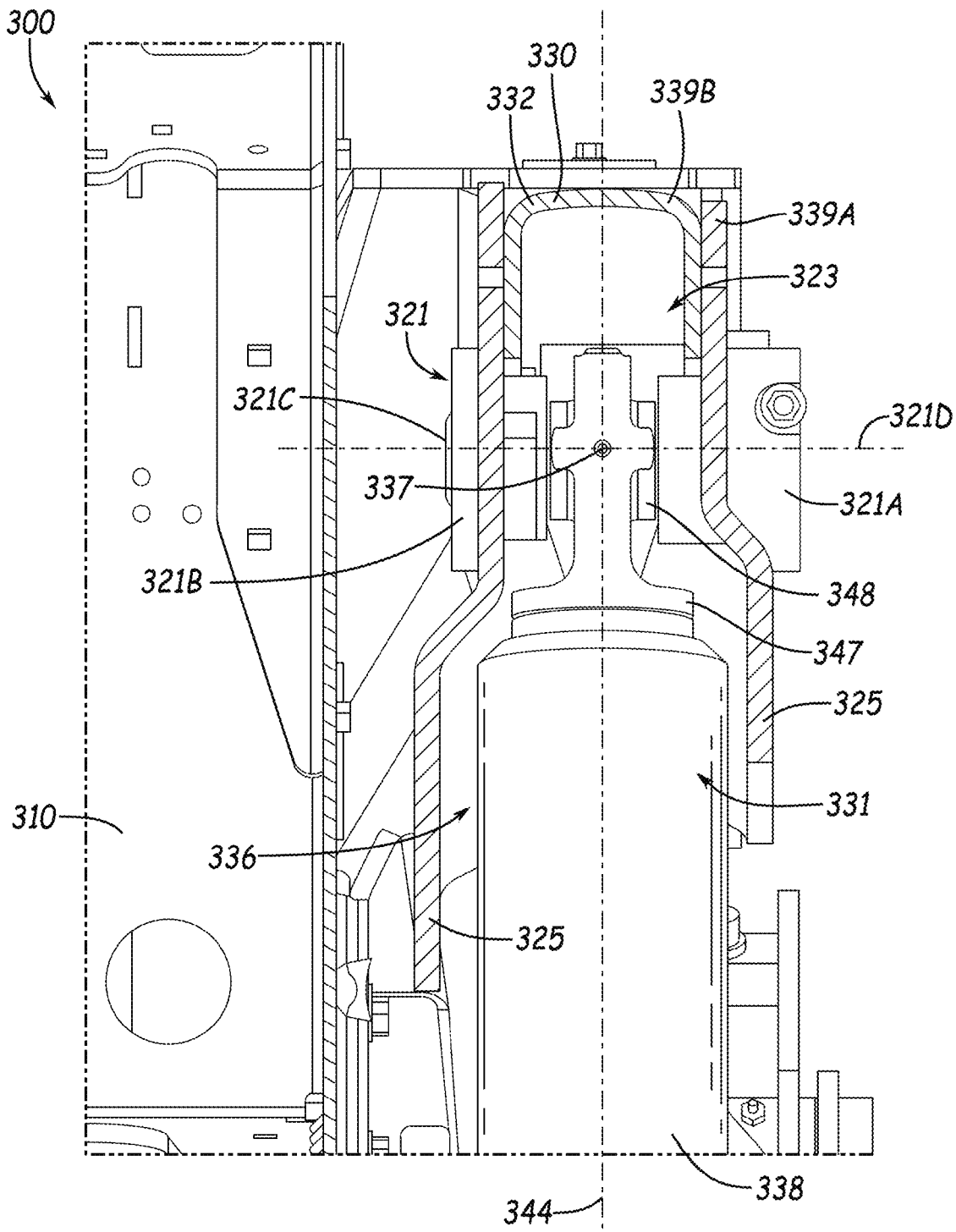
FIG. 9 is a rear cross-sectional partial view of a rear end of the power machine if FIG. 5, taken along line IX-IX in FIG. 8, showing the connection between a lift arm and the lift actuator of FIG. 7.

With additional reference to FIGS. 8 and 9, the lift actuator 338 is secured to the frame 310 within a lift actuator pocket 336 that is disposed proximate the rear end 310A of the frame 310. The lift actuator 338 is positioned so that it is in lateral alignment with an associated lift arm 332 of the lift arm structure 330 (i.e., is disposed vertically above or below the lift arm 332 at a common lateral displacement from a centerline of the machine 300). In the illustrated example in particular, as shown in FIG. 9, the lift actuators 338 are positioned within the lift actuator pocket 336 in lateral alignment with the lift arm 332, so that the extension axis 344 is coplanar with a neutral axis 337 of the lift arm 332 (or a center line of the lift arm 332). Additionally, the lift actuator 338 is beneficially oriented within the lift actuator pocket 336 so that the motor 341 is positioned within the lift actuator pocket 336 and located rearward of the ball screw 342 (i.e., closer to the rear end 310A of the frame 310) at all operational positions of the lift arm 332 (e.g., throughout the entire travel path of the lift arm 332).

For example, by mounting the lift actuator 338 in this manner, the frame 310 can be configured to include an angled lower-rear surface 315 so that a bottom side of the lift actuator pocket 336 angles upward proximate the rear end 310A of the frame 310. That is, the angled lower-rear surface 315 of the lift actuator pocket 336 angles upward, moving toward the rear end 310A, relative to a horizontal plane defined by a bottom of the frame 310 or by level ground on which the power machine 300 rests. The inclusion of the angled surface 315 can increase a departure angle 317 (see FIG. 5) of the power machine 300 (i.e., an angle between the ground and a line drawn between the rear of the track and the bottom of the frame in the rear of the machine) as compared to conventional designs with otherwise similar configurations. Additionally, as also discussed below, such an arrangement can also allow for a relatively large actuator to be fitted to the power machine 300, which can increase the overall range of motion of the lift arm structure 330 and provide improved load handling capabilities (e.g., increasing lift arm speed and acceleration, and increasing a maximum allowable load). Generally, an electrical lift actuator arranged as disclosed herein can allow for a departure angle of at least 25 degrees.

Relatedly, positioning a lift actuator within a lift actuator pocket can provide advantages over conventional mounting configurations. For example, by positioning the motor 341 within the lift actuator pocket 336, sensitive motor components (e.g., electrical components) can be protected from damage, including from external impacts, with the lift actuator pocket 336 providing lateral and rear shielding for the motor 341. Likewise, further protection of the motor 341 may be achieved when the motor 341 is disposed behind the ball screw 342 as a result of the fold-back configuration. Furthermore, positioning the motor 341 within the lift actuator pocket 336 can allow for particularly efficient routing of, for example, electrical power, control signal wire (e.g., control cables), and cooling lines (not shown). In this arrangement, the wires can also be protected from damage, as lengths of the wires can be run completely or substantially internal to the power machine 300, and thus may not be exposed to the exterior of the power machine 300. Moreover, pinch points that may catch and damage the wires can be reduced or eliminated. In particular, some examples can include high voltage wires (i.e., cables or other wires for signals of 40V or more), that can extend within a lift arm for substantially all of a length of the wires or of a portion of the lift arm. In some examples, high voltage or other wires can be entirely enclosed along all or substantially all of a length of a main beam or other portion of a lift arm, including within a fully enclosed volume defined by a body of the lift arm or by a partly enclosed volume defined by a body of the lift arm in combination with an attached cover. In other embodiments, other components, for example, hydraulic lines, of the power machine 300 can be run through a lift arm and into a pocket in a similar manner.

In other embodiments, a lift actuator can be mounted to a power machine differently. For example, a lift actuator may be connected to different parts of a frame or a lift arm and can be oriented differently (e.g., inverted from the orientation shown in FIG. 8). Additionally, a lift actuator may sometimes not be secured within a lift actuator pocket, for example, in retrofit applications where an electric lift actuator is used to replace a conventional hydraulic lift actuator.

A lift actuator can be operatively coupled between a frame and a lift arm of a power machine so as to move (e.g., lift) the lift arm relative to the frame. For example, in the illustrated embodiment, the lift actuator 338 is pivotally coupled to the frame 310 within the lift actuator pocket 336 at a lower (e.g., first) pivot connection 319 and to the lift arm 332 at an upper (e.g., second) pivot connection 321. The pivot connection 319 is configured as a pinned, clevis-joint connection, and the lift actuator 338 is positioned so that the bearing 346 can receive a pin 319A supported by inboard and outboard sides of the lift actuator pocket 336, to form the pivoting connection 319 and thereby allow the lift actuator 338 to pivot relative to the frame 310. The pin 319A can be secured on the exterior of the lift actuator pocket 336 by a plate or collar 319B to prevent the pin 319A from disengaging from the lift actuator 338 during operation or can be otherwise secured using various known arrangements.

With particular reference to FIG. 9, the pivot connection 321 is also configured as a pinned, clevis-joint connection, with the extendable end 348 positioned so that the bearing 349 is in axial alignment with each of an outboard collar 321A and an inboard collar 321B on the lift arm 332. Accordingly, a pin 321C can then be inserted through each of the first collar 321A, the second collar 321B, and the bearing 349 to form the second pivot connection 321, which allows the lift actuator 338 and the lift arm 332 to pivot relative to one another. In some embodiments, one or both of the first collar 321A and the second collar 321B can be configured as a locking collar to prevent a corresponding pin from disengaging from the lift actuator 338 during operation. For example, in the illustrated embodiment, only the first collar 321A is configured as a locking collar.

In some embodiments, pinned clevis-joint connections, including those described above, can allow for an electrical lift actuator to be readily installed in place of a hydraulic lift actuator, including in operations to convert or repurpose a power machine or power machine frame for electrically powered operations. Further, particularly for pivotal connections between lift actuators and frames of power machines, clevis-joint connections can provide notable improvements in placement of a lift actuator of a given size, as can improve departure angle and available range of movement for a lift arm. In other embodiments, however, electrical lift actuators can be secured to a power machine frame in other ways (e.g., using different types of connections).

In some cases, the position of a connection between a lift arm and a lift arm actuator can provide benefits for electrical lift actuators (and other types of actuators, in some cases). In that regard, in some embodiments, the position of a connection between a lift arm and a lift arm actuator can be beneficially located along a height of a power machine. For example, with continued reference to FIGS. 8 and 9, the upper pivot connection 321 is disposed within the lift arm 332, thereby increasing a minimum straight-line distance (e.g., a distance taken with the lift arm 332 in a fully lowered position) between a rotational axis 319C of the pivot connection 319 (e.g., an axis of the pin 319A) and a rotational axis 321D of the pivot connection 321 (e.g., an axis of the pin 321C), as compared with conventional mounting configurations (e.g., wherein a lift actuator is mounted below a lift arm).

In some embodiments, as shown in FIG. 8 in particular, the second pivot connection 321 can be provided so that the corresponding rotational axis 321D is at or above the neutral axis 337 of the lift arm 332 or another relevant reference axis (e.g., center line of the lift arm 332). Put another way, the rotational axis 321D can be disposed so that the neutral axis 337 intersects the rotational axis 321D or so that the neutral axis 337 passes between the rotational axes 319C, 321D (i.e., so that the rotational axis 319C of the first pivot connection 319 and the rotational axis 321D of the second pivot connection 321 are on opposite sides of the neutral axis 337 when viewed from a lateral side of the power machine 300). Relatedly, the rotational axis 321D of the second pivot connection 321 can be beneficially disposed at a midpoint between a local top side of the lift arm 332 and a local lower side of the lift arm 332, as measured along the extension direction of the lift actuator 338, or closer to the local top side of the lift arm 332 than to the local lower side.

Furthermore, the position of a connection between a lift arm and a lift arm actuator can be beneficially located along a length of a power machine or a lift arm. For example, as illustrated in FIGS. 5 and 8, the upper rotational axis 321D can be disposed so that it is rearward of a rotational axis of a rearmost idler 347 of a tractive element of the traction system 340 (see FIG. 5). In other embodiments, for example, on a wheeled power machine, the rotational axis 321D of the second pivot connection 321 can be disposed rearward of an axle of a rear wheel of the power machine 300 (or, similarly, rearward of a rear axle of a quad-track or other power machine).

In some embodiments, it may provide favorable kinematics and otherwise improve performance, while also improving the protective value of pockets for lift arm actuators, to locate a pivotal connection between a lift actuator and a lift arm toward a rear portion of the lift arm. For example in some embodiments, the rotational axis 321D of the second pivot connection 321 can be disposed along a rear half, a rear third, or a rear quarter of the lift arm 332 or of a portion thereof (e.g., the second portion 334B or main beam of the lift arm 332). In some embodiments, it may be similarly useful to dispose the rotational axis 321D to remain rearward of the operator station 350 or an axis of a drive shaft (e.g., a drive shaft 351 of a tractive element of the traction system 340, as shown in FIG. 5) of a power machine for all orientations of the lift arm 332.

As a result of the different configurations discussed above, alone and in various combinations, a power machine can generally be fitted with larger lift actuators than may be possible with conventional designs, which may, for example, provide increased power and allow for an increased range of motion of a lift arm. Additionally, the improved lift actuator configurations discussed herein can also provide a power machine with an increased mechanical advantage as compared to some conventional designs, as may also improve overall power machine utility.

In some cases, with a lift actuator in lateral alignment with an associated lift arm (e.g., disposed vertically below, as shown), the lift arm can be configured to receive at least a portion of the lift actuator, as can improve protection of certain components and range of motion of a lift arm in general. For example, with continued reference to FIGS. 8 and 9, the lift arm 332 includes a pocket 323 that is configured to receive a distal end of the ball screw 342 and the extendable end 348 within the lift arm 332 to form the second pivot connection 321. More specifically, in the illustrated embodiment, the first beam portion 339A includes opposing flared lateral side portions 325 that extend as sidewalls below the main body of the main portion 334B of the lift arm, on inboard and outboard sides of the pocket 323, to define the lower opening 331 that opens into the pocket 323 and allow the ball screw 342 to pivot freely within the lift arm 332. In that regard, the flared portions 325 and the pocket 323 are sized and shaped to ensure that the ball screw 342 does not contact the lift arm 332 throughout an entire range of travel of the lift arm 332 (i.e., along an entire travel path). Additionally, the second beam portion 339B includes a recessed profile 327 at a proximal end thereof (see FIG. 8) to ensure that the extendable end 348 also does not contact the lift arm 332 throughout an entire range of travel of the lift arm 332.

As also similarly discussed relative to the lift arm 332 generally, it may be beneficial in some cases to locate a lift actuator to extend through a particular part of a pocket in a lift arm at a particular orientation of the lift arm. For example, as shown in FIG. 8 in particular, the ball screw 342 of the lift actuator 338 extends through a forward half of the pocket 323 when the lift arm 332 is in the fully lowered configuration.

Providing an opening within a lift arm to receive a lift actuator can also provide benefits in some configurations. For example, by including flared portions around an opening, larger lift actuators can be fitted to a power machine. Additionally, the lift arm can thereby provide protective shielding for any components disposed within the lift arm, including, for example, a bearing of an extendable portion of the lift arm that forms part of the pivot connection with the lift arm.

Figure 10:
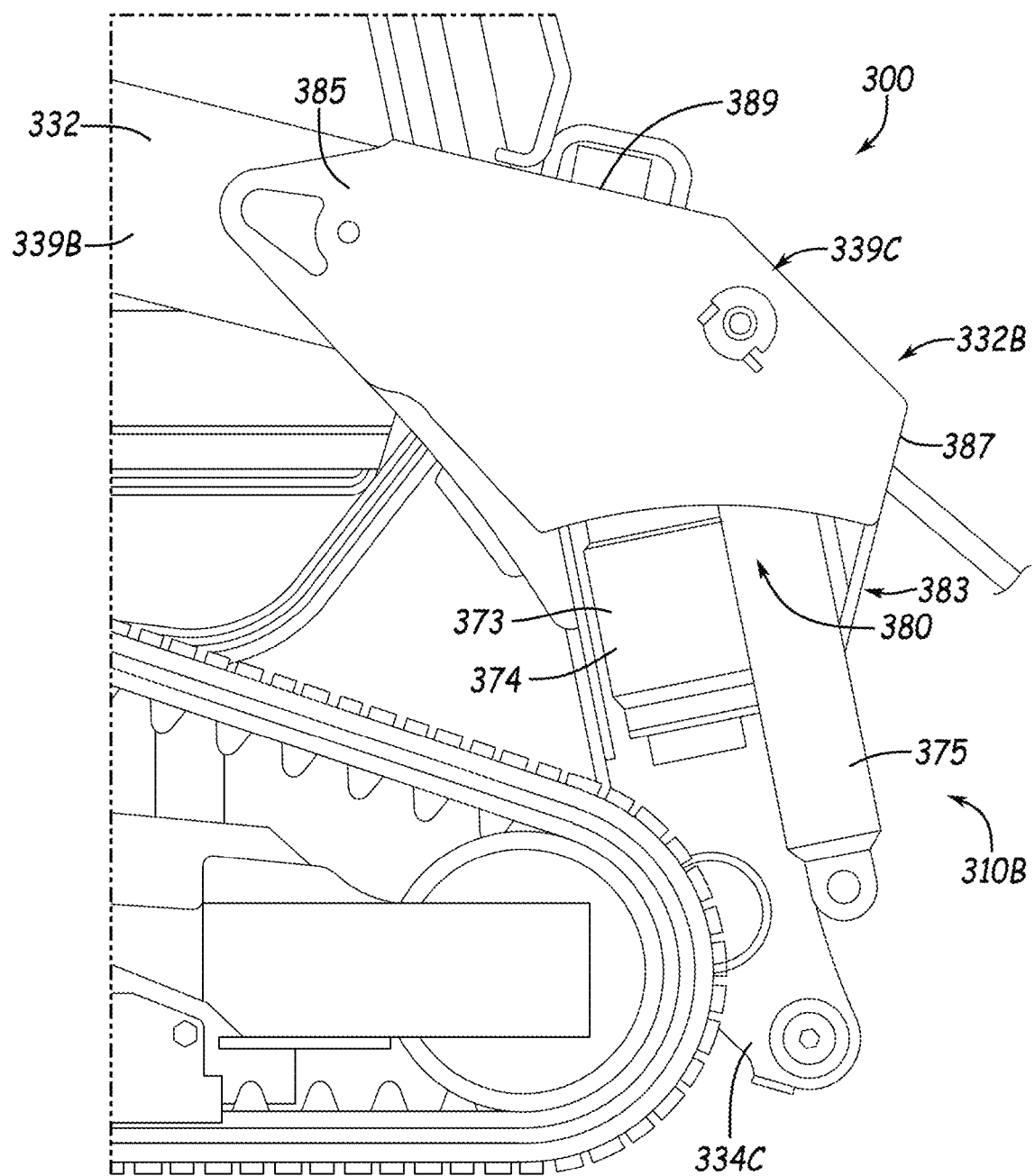
FIG. 10 is a partial side plan view of a front end of the power machine of FIG. 5, including the tilt actuator.
Figure 11:
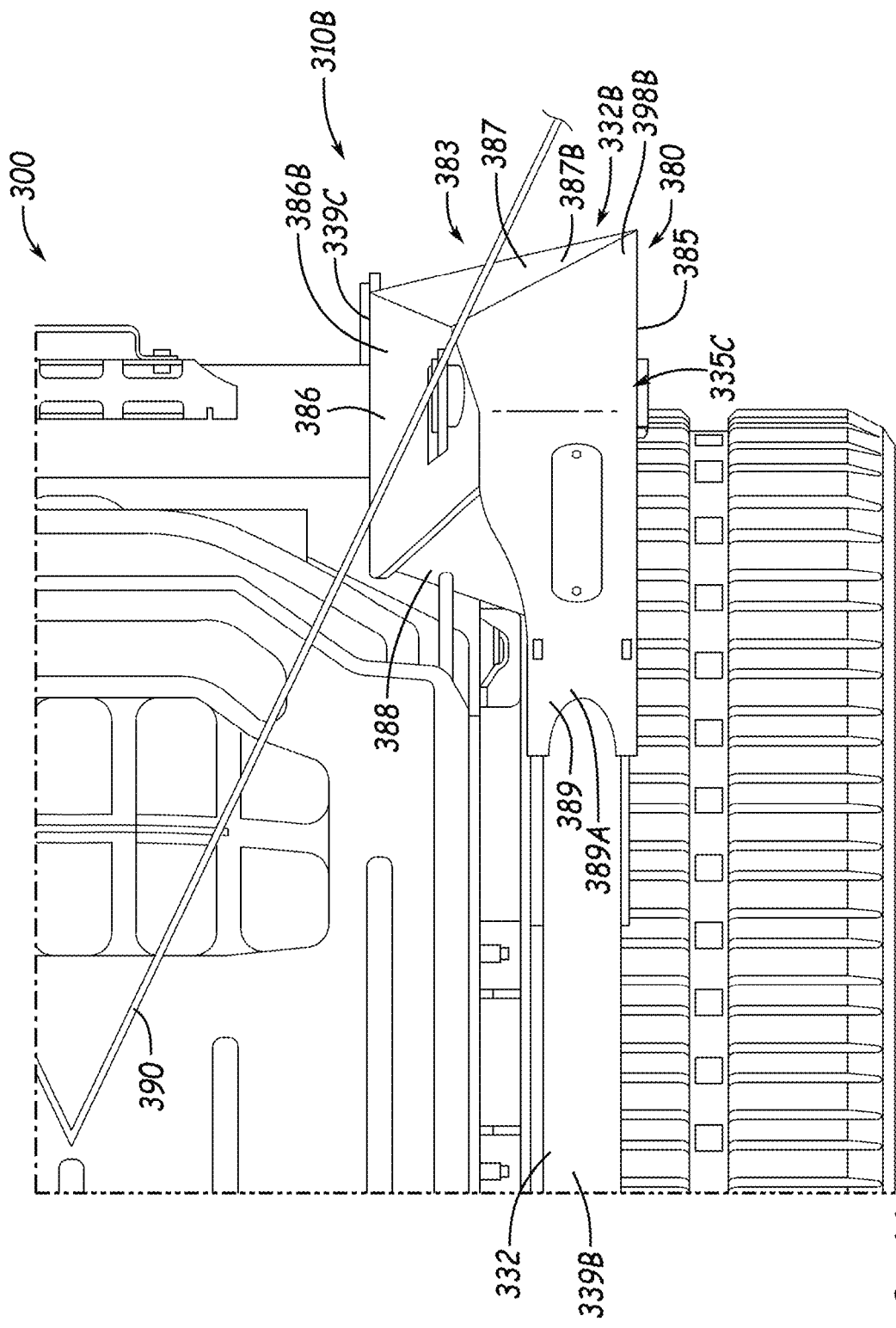
FIG. 11 is a partial top view of the front end of the power machine of FIG. 5.
Figure 12:
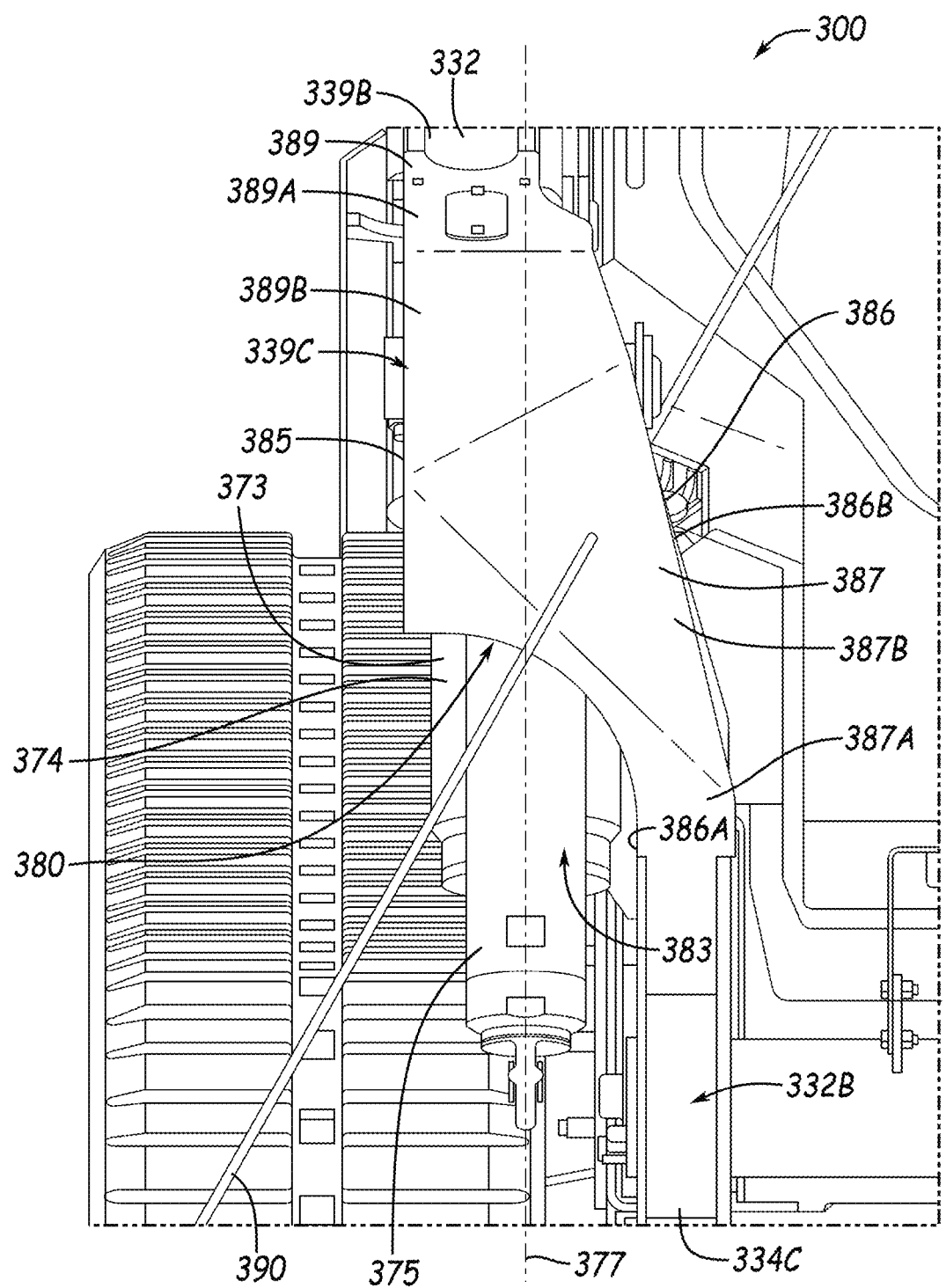
FIG. 12 is a partial front plan view of the front end of the power machine of FIG. 5.
Figure 13:
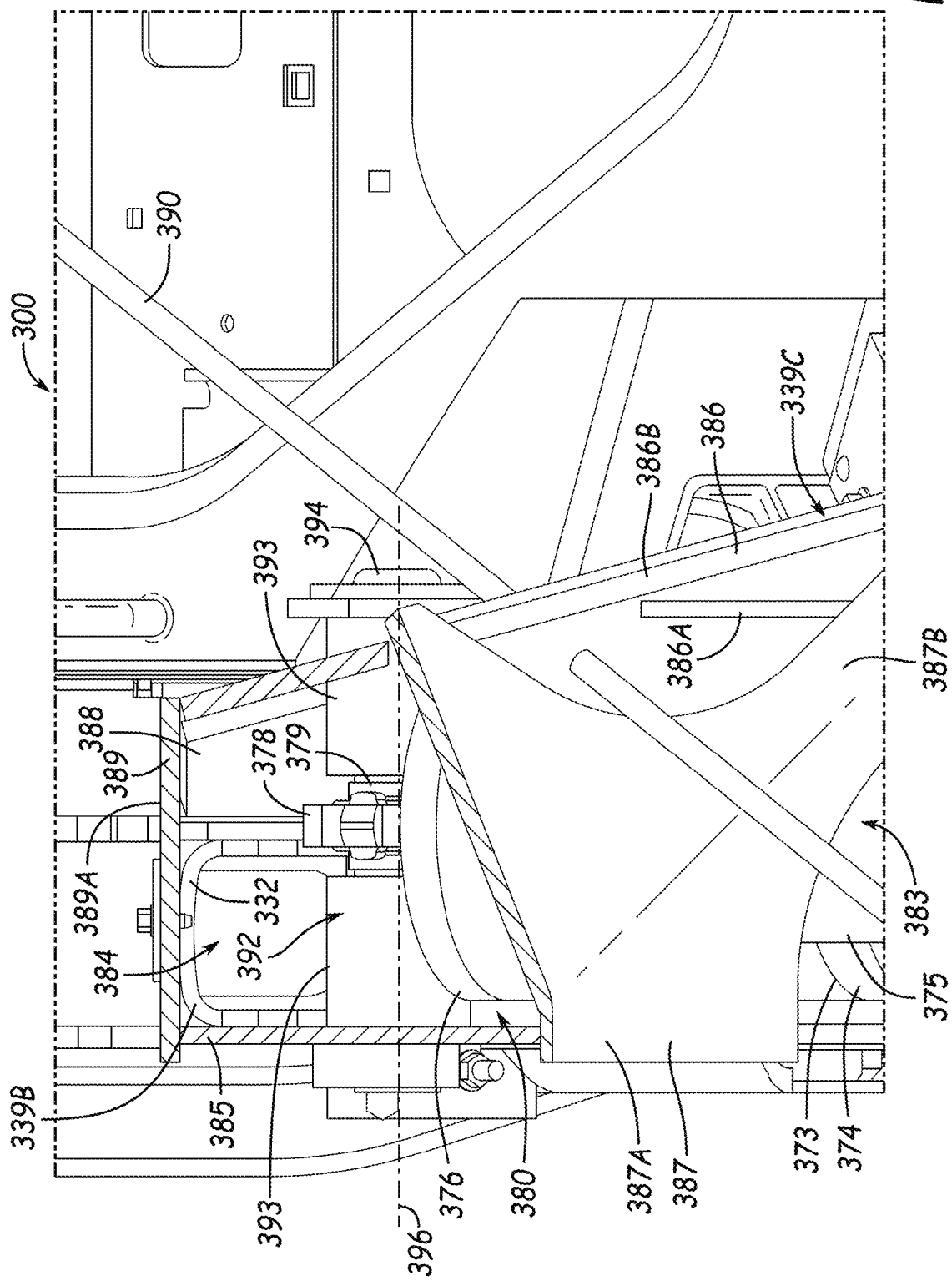
FIG. 13 is a partial front plan view of a top portion of the front end of the power machine of FIG. 10 with a portion of a lift arm removed.
Figure 14:
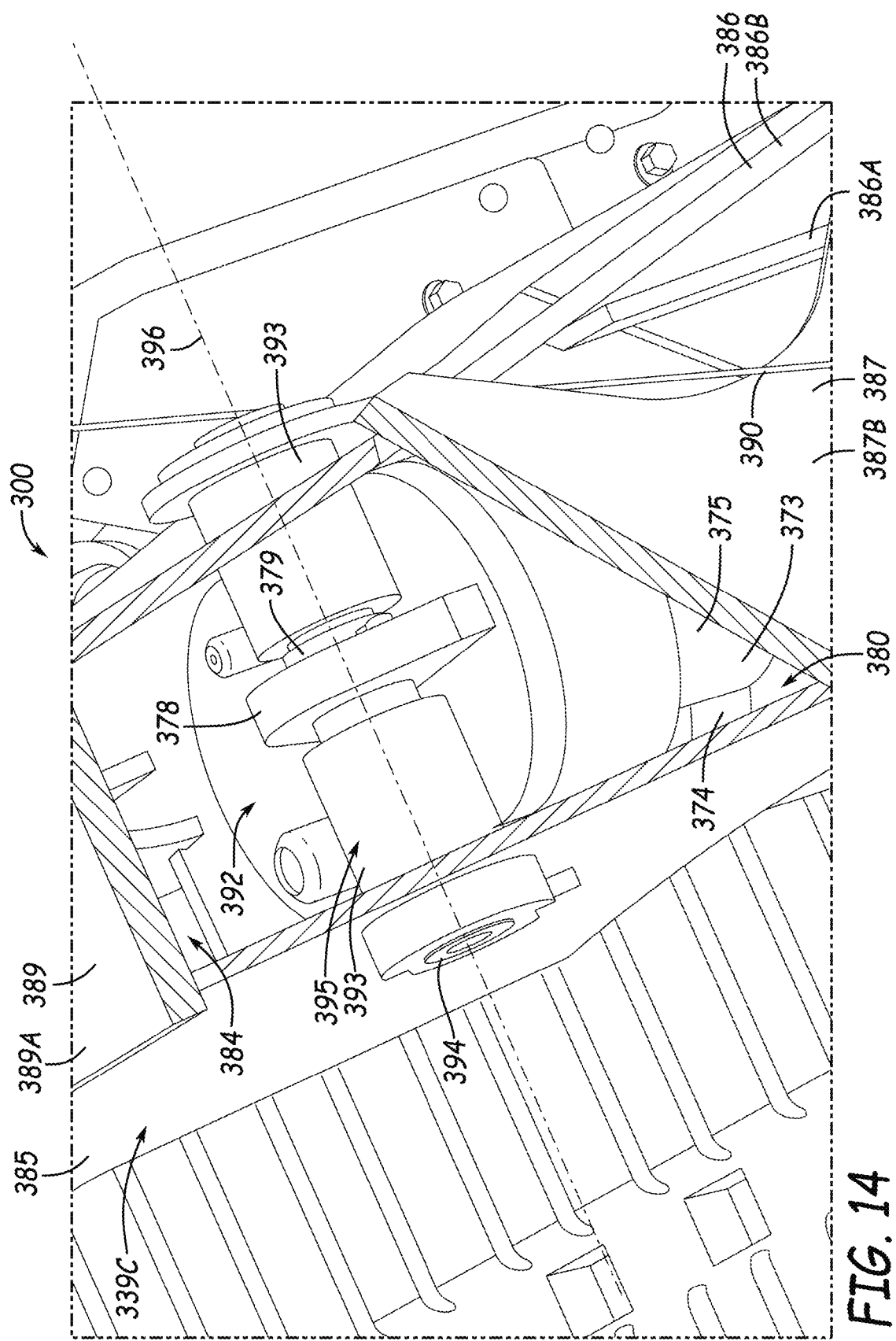
FIG. 14 is a partial perspective view of the top portion of the front end the power machine of FIG. 11.

Continuing, with reference to FIG. 10, the tilt actuator 373 is secured to the lift arm 332 near the front 332B of the second portion 334B of the lift arm 332 and proximate the front frame end 310B. More specifically, the tilt actuator 373 is secured and extends within a tilt actuator pocket 380 formed in the third beam portion 339C of the lift arm 332, so that it is in lateral alignment with the second beam portion 339B (e.g., a main beam) of the lift arm 332. In some cases, a tilt actuator can be substantially laterally aligned with a main beam of a lift arm. That is, at least half of a width (e.g., a dimension taken perpendicular to the longitudinal plane 313, as shown in FIG. 6) of the tilt actuator may be in lateral alignment with a main portion of a lift arm.

A tilt actuator can be configured to operatively connect between a lift arm of a lift arm structure and an implement carrier or implement. In particular, and as will be discussed in greater detail below, the tilt actuator 373 is rotatably coupled between the lift arm 332 and an implement carrier 372 (see FIG. 6), which is generally similar to the implement carrier 272 (see FIG. 2). In this regard, the tilt actuator 373 is configured to controllably rotate the implement carrier 372 and any attached implement relative to the lift arm structure 330. Thus, for example, a control module can electronically control operation of the tilt actuators 373, as powered by the power source 335, in order to selectively change an attitude of an implement secured to the implement carrier 372 with respect to the lift arm 332. In some embodiments, an implement may be directly attached to a lift arm structure, rather than being attached to a lift arm structure via an implement carrier. In such cases, the tilt actuator 373 can be used in a similar manner to adjust the attitude of an implement directly, rather than by adjusting an attitude of an implement carrier.

Referring now to FIGS. 10-15, in the illustrated embodiment, the tilt actuator 373 is configured as an electrically powered ball screw actuator, which is similar to the lift actuator 338 described above (see FIG. 7). In particular, each tilt actuator 373 includes a motor 374 (i.e., an electrical motor) and an extendable portion configured as a ball screw 375, which are operatively connected to one another via a gearbox 376. More specifically, the tilt actuators 373 are in a fold-back motor configuration wherein each respective motor 374 and screw 375 extend parallel to one another from the same side of the gearbox 376 (see FIG. 13), with the motors 374 beneficially located rearward of the screws 375. That is, the screw 375 defines and extends away from the gearbox 376 along an extension axis 377 (see FIG. 12) and the motor 374 extends parallel to and in the same direction as the screw 375. The screw 375 is configured to linearly extend and retract along the extension axis 377 when powered by the motor 374 via the gearbox 376. More specifically, the motor 374 can be controlled by commands from a control module (i.e., in response to operator input), thereby controlling the extension and retraction of the screw 375.

Although ball screws and fold-back motor configurations may be particularly beneficial relative to lift arm structures discussed herein, in other embodiments, other configurations are possible. For example, a tilt actuator can be another type of electrical actuator, including a lead screw, belt driven, or other geared actuator, or can include with motors with in-line or perpendicular configurations. Moreover, a tilt actuator may be otherwise arranged differently than illustrated, including with in-line motor configurations.

Although a tilt actuator can include various connection structures to pivotally secure the tilt actuator to a lift arm, some arrangements may provide particular stability and utility for electrical actuators, including when implemented in combination with other principles discussed herein (e.g., the disclosed lateral alignments, pocket-mounted configurations, etc.) For example, as also shown for the illustrated embodiment in FIGS. 13 and 14, each tilt actuator 373 includes an upright flange 378 (e.g., similar to a pillow block structure) coupled with and extending from the gearbox 376 opposite the motor 374 and the screw 375. The flange 378 is stationary relative to the gearbox 376 and is configured to receive a bushing or bearing 379 that is configured to rotatably couple with a portion of the respective lift arm 232. Here, the bearing 379 is configured as a spherical bearing that can allow for some axial displacement (i.e., misalignment) or can help to prevent induced side-loading on the body of an associated actuator, although other types of bearings and bushings may also be used. The flange 378 may be removably coupled or integrally formed with the gearbox 376.

Additionally, each of the tilt actuators 373 further includes an extendable end 381 disposed at a distal end of the screw 375 (i.e., an end of the screw 375 disposed furthest away from the gearbox 376). Here the extendable end 381 includes a similar spherical bearing 382 that is configured to rotatably couple with the implement carrier 372, although other types of ends, bearings, and/or bushings may also be used. The extendable end 381 can be extended and retracted with the screw 375 to move linearly relative to the gearbox 376 and thereby, via the spherical bearing 382, adjust the attitude of the implement carrier 372.

With continued reference to FIGS. 10-14, the third beam portion 339C (i.e., the second end 332B of the lift arm 332) includes a leg 334C (e.g., an inner leg) of the lift arm 332 and an inward jog 383 that extends between the second beam portion 339B of the lift arm 332 and the leg 334C (e.g., an inner leg) of the lift arm 332. As shown in the illustrated embodiment, the inward jog 383 and the leg 334C can be integrally formed with one another. Further, the inward jog 383 is configured so that the leg 334C of the lift arm 332 is generally positioned closer to the longitudinal plane 313 of FIG. 6 (i.e., more laterally inward) than the second beam portion 339B (e.g., a main beam) of the lift arm 332. In other words, the leg 334C is generally offset laterally inward from the second beam portion 339B. In particular, in the illustrated example, the inward jog 383 angles downward and laterally inward from the second beam portion 339B to connect with the leg 334C. The leg 334C is shown as being generally parallel to the second beam portion 339B, as viewed from the front, but it may also be laterally angled (i.e., not parallel) relative to the second beam portion 339B.

As shown in the illustrated embodiment, the inward jogs 383 and the legs 334C can be integrally formed with one another. Taken together, the inward jogs 383 and the legs 334C form a lower beam as a front portion of the lift arm 332, which is coupled with the main beam or second portion 334B of the lift arm 332 at a bent knee of the lift arm 332. Here, the front portion of the lift arm 332 is welded to the second portion 334B but other configurations are possible. For example, a front portion of a lift arm may be fastened to a second portion of the lift arm to allow the front portion to be replaced with a different front portion or other structure.

As mentioned above, the third beam portion 339C of the lift arm 332 is generally configured to couple with and support the tilt actuator 373 in the desired orientation for rotating the implement carrier 372 (see FIG. 6) to adjust the attitude of the implement carrier 372 relative to the lift arm 332. Correspondingly, the third beam portion 339C of the lift arm 332 is coupled with and extends downwardly from the front-most part of the second beam portion 339B of the lift arm 332 (i.e., an end of the second beam portion 339B that is nearest the second end 332B of the lift arm 332). In this way, the third beam portion 339C of the lift arm 332 is the lowest portion of the lift arm 332 when the lift arm 332 is in its lowest configuration (sec. FIG. 5) so that the implement carrier and implement can be positioned near or in contact with a support surface (e.g., the ground).

The inward jogs 383 of the third beam portion 339C of the lift arm 332 can provide beneficial lift arm geometries in some cases. For example, the inward jog 383 can allow the tilt actuator 373 to extend along a laterally exterior side of the leg 334C of the lift arm 332, without excessively extending the lateral footprint of the lift arm structure 330. Because the tilt actuator 373 can be mounted to extend laterally outward of the leg 334C, the available lateral space near the implement carrier 372 and a front frame end 310B can be increased, as compared to conventional arrangements. This increased lateral space can provide operators with more room to enter and exit the power machine 300. Additionally, as will be discussed below, operator visibility can be improved. Further, the tilt actuator 373 can be positioned below and in substantial lateral alignment with the second beam portion 339B of the lift arm 332, which can reduce moments and other stresses on the lift arm 332 due to loading, thereby providing for a more efficient operation of the lift arm structure 330 and the power machine 300 generally. Relatedly, the tilt actuator 373 can also be coupled higher and further rearward towards the second beam portion 339B of the lift arm 332, allowing for improved mechanical advantage and increased actuator stroke length.

In some cases, a tilt actuator pocket can be formed at an inward jog. A tilt actuator pocket can provide a variety of benefits for mounting tilt actuators, including by improving structural strength as well as shielding actuators, including any associated connectors and/or cables, from debris or damage from certain impacts. With continued reference to FIGS. 10-14, in the illustrated embodiment, the tilt actuator pocket 380 is disposed generally in front of and below the second beam portion 339B of the lift arm 332 and laterally exterior to the leg 334C of the respective lift arm 332.

The tilt actuator pocket 380 is configured to form a protective housing that at least partially surrounds (i.e., encloses) the tilt actuator 373. More specifically, the tilt actuator pocket 380 is formed as downward opening recess that receives at least a portion of the tilt actuator 373. Accordingly, the tilt actuator pocket 380 is configured to receive at least part of the corresponding tilt actuator 373 therein, with a width and a length of the tilt actuator pocket 380 being correspondingly sized. In particular, in the illustrated embodiment, an interior of the tilt actuator pocket 380 has a first width (i.e., a dimension perpendicular to the longitudinal plane 313) that is larger than a corresponding first width of the motor 374 of the tilt actuator 373, and a second width (i.e., a dimension that is parallel to the longitudinal plane 313) that is larger than a corresponding second width of the tilt actuator 373. Thus, as further discussed below, at least a portion of the tilt actuator 373 can be received within the tilt actuator pocket 380 to be shielded on front, rear, lateral, and top sides thereof during operation, thereby helping to reduce or prevent impacts on the tilt actuator 373 and also provide improved debris or water shielding.

In some embodiments, the tilt actuator pocket 380 may include an interior opening 384 (see FIG. 13) that receives and opens into the second beam portion 339B of the lift arm 332. Because the second beam portion 339B of the lift arm 332 is hollow, power and/or signal cables (not shown) for the tilt actuator 373 can thus be run through the second beam portion 339B of the lift arm 332 and into the tilt actuator pocket 380. In this arrangement, the cables can be protected from damage, as they can be run completely or substantially internal to the power machine 300, and thus may not be exposed to the exterior of the power machine 300. Relatedly, pinch points that may catch and damage the cables can be reduced or eliminated. In other embodiments, other components, for example, hydraulic lines, of the power machine 300 can be run through a lift arm and into a pocket in a similar manner.

A tilt actuator pocket can have a variety of shapes and is configured to generally shield the front, back, and both lateral sides of the respective tilt actuator, particularly along an upper portion of the tilt actuator. In the illustrated embodiment, the tilt actuator pocket 380 includes a first, laterally outward wall 385 generally opposite a second, laterally inward wall 386, and a third, front wall 387 generally opposite a fourth, back wall 388, all of which are coupled with and extend generally downward from a fifth or top wall 389 to provide an inward taper toward the top wall 389. The laterally outward wall 385 is coupled with and extends between each of the second portion 334B of the lift arm 332, the top wall 389, and the front wall 387 and thus provides a structural connection between the second and third beam portions 339B, 339C (i.e., between the second beam portion 339B and the leg 334C). The laterally inward wall 386 is coupled with and extends between each of the front wall 387, the back wall 388, and the top wall 389 and thus also provides a structural connection between the second and third beam portions 339B, 339C. The front wall 387 is coupled with and extends between each of the laterally outward wall 385, the laterally inward wall 386, and the top wall 389. The back wall 388 is coupled with and extends between each of the second portion 334B of the lift arm 332, the laterally inward wall 386, and the top wall 389. In other embodiments, the tilt actuator pocket 380 can be formed from more or less panels and/or other portions of the lift arm 332. In that regard, the various panels that define the tilt actuator pocket 380 may also be arranged and connected differently.

Each of the respective walls of the tilt actuator pocket 380 can be comprised of one or more panels (i.e., portions) that are coupled with one another. For example, the top wall 389 includes a first, rear top panel 389A, and a second, front top panel 389B that is angled downward and forward from the rear top panel 389A, the laterally inward wall 386 includes a first, lower laterally inward panel 386A and a second, upper laterally inward panel 386B extending upward and laterally outward from the laterally inward panel 386A, and the front wall 387 includes a first, lower front panel 387A and a second, upper front panel 387B.

Additionally, the walls that make up a tilt actuator pocket can be sized to provide varying amounts of protection for the tilt actuator. That is, a tilt actuator pocket may fully enclose a tilt actuator for at least a portion of a length of the tilt actuator (i.e., a length taken along an axis of extension of the tilt actuator). For example, in the illustrated embodiment, the flange 378, gearbox 376, and a portion of each of the motor 374 and the screw 375 are enclosed by the tilt actuator pocket 380. As a result, comparatively sensitive electric connections and related components can be particularly well protected by the tilt actuator pocket 380 from possible damage, including due to contact or water ingress. Further, the particular configuration illustrated can also help to reduce overall lift arm weight and improve access for maintenance. Similarly, substantially all of the laterally interior side of the tilt actuator 373 is protected from contact by the laterally inward wall 386 of the tilt actuator pocket 380 and the extension of the leg 334C beyond the tilt actuator pocket 380. In other embodiments, the various walls of the tilt actuator pocket 380 may enclose more or less of the tilt actuator 373.

In some cases, tilt actuator pockets or similar other mounting configurations for a tilt actuator can help to reduce or eliminate interference with a line of sight of an operator relative to an implement or other reference frame. For example, with reference to FIG. 12 in particular, the upper front panel 387B is obliquely angled between the lower front panel 387A, the front top panel 389B, and the upper laterally inward panel 386B. More specifically, the upper front panel 387B is angled downward from a perspective moving from back to front of the power machine 300, and laterally outward relative to the longitudinal plane 313. Thus, the lift arm 332, and more specifically the inward jog 383, may not substantially protrude (e.g., may not protrude at all) into a field of view of the operator (i.e., as partially represented by line of sight 390) that may be defined by a reference operator height (e.g., 5.0 ft. to 6.5 ft., inclusive) and a reference implement width (see FIGS. 6, 11, and 13). With the upper front panel 387B oriented as shown, an operator may be able to see all or substantially all of the (e.g., an entire) width of a cutting edge of a bucket attached to the lift arm structure 330 (see FIG. 6), which may not be possible with electrical actuators attached to conventional lift arm designs. In other embodiments, lift arms and the various panels that comprise the tilt actuator pockets may be configured differently to achieve similar results. For example, tilt actuator pockets can alternatively or additionally include cut-outs or recesses.

In addition to other benefits described above and below, tilt actuator pockets may be beneficial for reducing weight of a lift arm structure while maintaining appropriate structural integrity of the lift arm structures. In this regard, for example, some tilt actuator pockets in lift arms can be formed to partly include walls (e.g., for shielding rather than structural support between lift arm portions) that are made of separate, lighter material than the material of other parts of the lift arms.

As well as providing an otherwise beneficial lift arm geometry and protection for a tilt actuator, an inward jog and an associated tilt actuator pocket can also provide useful mounting features and configurations for tilt actuators. Specifically, with reference to FIGS. 13 and 14, the tilt actuator 373 is rotatably coupled (e.g., by a pinned connection) to the lift arm 332 within and at a proximal end of each of the tilt actuator pocket 380, thereby placing the tilt actuator 373 in a relatively protected position. In the illustrated embodiment, a first attachment structure 392 is provided in the tilt actuator pocket 380, near the inward jog 383, to rotatably couple to the motor and gearbox end of the tilt actuator 373 at the flange 378.

In some embodiments, particular configurations of attachment structures for tilt actuators may be particularly beneficial, and in some cases, particularly for use with electrical tilt actuators. In this regard, in the illustrated example, the first attachment structure 392 is configured as a double-sided pinned connection, with a clevis joint formed for the tilt actuator 373 by a pair of bosses 393 extending laterally inward into the tilt actuator pocket 380 from each of the laterally outward wall 385 and the laterally inward wall 386. The bosses 393 are aligned with one another to define a pivot axis 396 of the first attachment structure 392. Additionally, the bosses 393 are spaced from one another within the tilt actuator pocket 380 to allow the flange 378 and the corresponding bearing 379 to be disposed between the bosses 393. Thus, the pin 394 can be inserted through the bosses 393 and the bearing 379 of the tilt actuator 373 to secure the tilt actuator 373 in the tilt actuator pocket 380. When the pin 394 is received by the bearing 379, the bearing 379 is aligned with the pivot axis 396. In that regard, the pin 394 can be fixed relative to the bosses 393 so that the relative rotation of the tilt actuator 373 about the pivot axis 396 is provided solely by the bearing 379. This arrangement, as facilitated by the location and geometry of the corresponding pocket(s), can help to reduce adverse moments or torsional stresses on relevant components, although other configurations, including methods for securing a tilt actuator in a pocket are also possible.

In some embodiments, a clevis-joint arrangement to secure an electrical actuator can provide additional benefits. For example, referring to FIG. 13, the clevis-joint connection between the tilt actuator 373 and the third beam portion 339C (e.g., at the bearing 379 and the flange 378, in particular) can be laterally aligned with a lateral side wall of the second beam portion 339B (e.g., the laterally interior side wall of the second beam portion 339B, as shown). This arrangement can help to provide improved stability and loading of electrical (or other) tilt actuators, while also allowing for improvements in shielding, as generally discussed above. Further, in some cases, the structural supports for a clevis-joint connection can also help to provide improved visibility. For example, with the illustrated arrangement, a support wall for the boss 393 can stand proud of the wall 386 (and the panel 386B in particular) with a relatively small profile, thereby ensuring appropriate structural support for the tilt actuator 373 while also facilitating a relatively substantial outward angling of the wall 386 and a corresponding increase in visibility. Similarly, a clevis-joint arrangement can help to facilitate improved packaging by allowing a tilt actuator to extend only laterally to the inside of a laterally exterior boundary of a lift arm structure as a whole (e.g., as shown for the tilt actuator 373 and the lift arm structure 330 in FIG. 13) so that the tilt actuator does not increase the overall lateral footprint of the lift arm structure.

Figure 15:
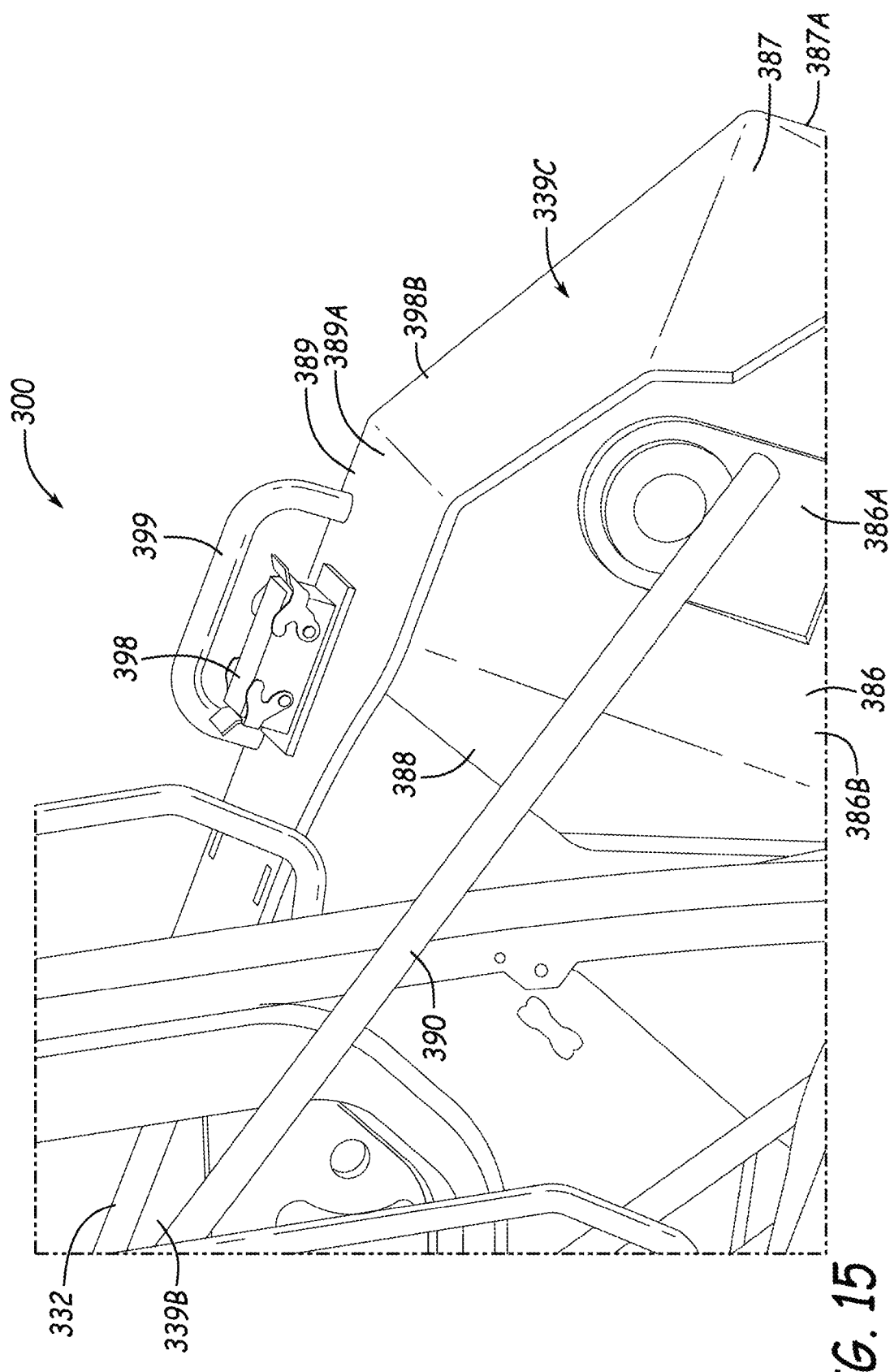
FIG. 15 is a partial perspective view of the front end of the power machine of FIG. 5 showing an auxiliary power connector on a lift arm of the power machine.
Figure 16:
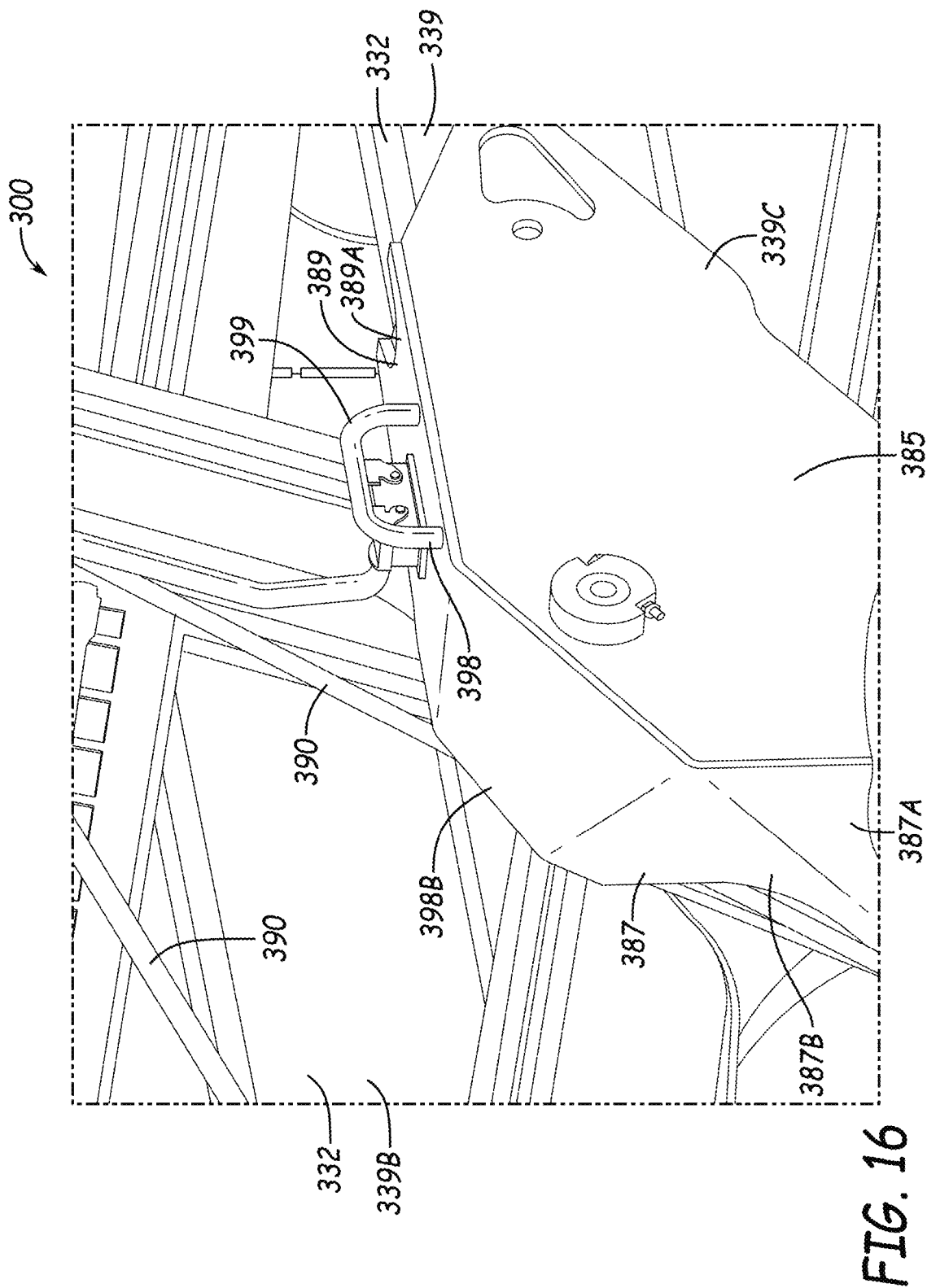
FIG. 16 is another partial perspective view of the power machine of FIG. 5 showing the auxiliary power connector.

Turning now to FIGS. 15 and 16, tilt actuator pockets can also provide beneficial arrangements of auxiliary connectors to supply power to powered implements. In the illustrated embodiment, the top wall 389 of the tilt actuator pocket 380 includes an electrical connector 398. Due to the tilt actuator pocket 380 being internally connected with the second beam portion 339B of the lift arm 332, power cables (not shown) for the electrical connector 398 can be run internally (e.g., within the second beam portion 339B of the lift arm 332) to protect them from damage, pinch points, etc. Furthermore, by placing the electrical connector 398 on the top wall 389, it may be easier for an operator to use the electrical connector 398, as compared to conventional designs in which the connector may be in more confined space. In some embodiments, a guard 399 may be provided to protect the electrical connector 398 from damage. In other embodiments, an electrical connector can be provided on other portions of a pocket or lift arm generally, for example a front wall, a laterally exterior wall, a back wall, or a laterally interior wall of a tilt actuator pocket. Furthermore, other types of connectors may be provided in a similar manner, including, for example, a hydraulic connector.

Thus, embodiments of the disclosed power machine and components thereof can provide improvements over conventional designs. For example, the quick response and precise control provided by electrical actuators can allow work elements, including traction elements, lift arms, and implement carriers, to be adjusted quickly and accurately, including with complex and adaptable control strategies as implemented by electronic control modules. Further, electrical actuation and control can, in some instances, simplify automated implementation of repetitive or iterative movements of work elements, while also reducing the need for maintenance and eliminating problems associated with leakage of hydraulic fluid and other related issues.

Although the present invention has been described with reference to preferred embodiments, workers skilled in the art will recognize that changes may be made in form and detail to the disclosed embodiments without departing from the spirit and scope of the concepts discussed herein.

What is claimed is:

1. A power machine for movably operating an implement, the power machine comprising:
   a frame that supports an operator station;
   an electrical power source supported by the frame; and
   a lift arm structure supported by the frame, the lift arm structure including:
      an upper beam of a lift arm, extending along a lateral side of the frame, with a proximal end of the upper beam movably secured to the frame at a rear portion of the frame, and with a distal end of the upper beam extending at a front portion of the frame;
      a lower beam of the lift arm coupled at a knee to the distal end of the upper beam;
      an implement or implement carrier movably secured to the lower beam at a distal end of the lower beam; and
      an electrical tilt actuator including an electrical motor powered by the electrical power source and a screw extender powered by the electric motor, the electrical tilt actuator being secured to the lower beam at a distal end of the lift arm and extending along a laterally exterior side of the lower beam, the electrical tilt actuator being configured to be controllably extended and retracted to change an attitude of the implement or implement carrier,
   the screw extender extending downwardly when the lift arm is in a fully lowered position, the electrical motor being in a foldback configuration relative to the screw extender, aligned behind the screw extender and shielded by the lift arm along a laterally exterior side of the electrical motor, and the electrical motor being recessed within a tilt actuator pocket that extends into the distal end of the lift arm, and
   with the lift arm structure in a fully lowered orientation, a front wall of the tilt actuator pocket shielding at least part of a front side of the screw extender.

2. The power machine of claim 1 wherein the electrical tilt actuator is secured to the lower beam by a pinned connection within a proximal end of the tilt actuator pocket.

3. The power machine of claim 2, wherein the pinned connection includes a pin supported relative to the lower beam at opposing lateral sides of the tilt actuator pocket; and
   wherein a support plate of the pinned connection extends proud from the lower beam, spaced laterally inwardly from a laterally interior side of the lower beam, to support the pin.

4. The power machine of claim 1, wherein a proximal end of the electrical tilt actuator is secured to the lower beam by a pinned connection that is supported by the lower beam at opposed lateral sides of an extension axis of the screw extender.

5. A power machine comprising:
   a main frame;
   a power source supported by the main frame;

a lift arm movably secured to the main frame at a proximal end and extending along a lateral side of the main frame to a distal end;

an implement or implement carrier movable secured to the distal end of the lift arm;

means for transmitting power from the power source to the distal end of the lift arm;

means for converting the transmitted power to rotational power, supported at the distal end of the lift arm and recessed within a tilt actuator pocket that extends into the distal end of the lift arm; and means for converting the rotational power to extension and retraction, supported at the distal end of the lift arm and operably connected to the means for converting the transmitted power, the means for converting the rotational power being extendable and retractable along an extension axis laterally outboard of the distal end of the lift arm, the means for converting the rotational power extending downwardly when the lift arm is in a fully lowered position, the means for converting the transmitted power being in a foldback configuration relative to the means for converting the rotational power, and the means for converting the transmitted power being aligned behind the means for converting the rotational power and being shielded by the lift arm along a laterally exterior side of the means for converting the transmitted power, and with the lift arm in a fully lowered orientation, a front wall of the tilt actuator pocket shielding at least part of a front side of the means for converting the rotational power.

6. The power machine of claim 5, wherein the lift arm includes a main beam that is pivotally secured to the main frame at the proximal end of the lift arm;

wherein the distal end of the lift arm includes a lower beam that extends from a bent knee connection with the main beam to support the implement or implement carrier; and wherein the means for converting the rotational power extends along a laterally exterior side of the lower beam.

7. The power machine of claim 6, wherein the lower beam includes an inner leg and a lateral jog that extends outwardly from the inner leg to connect the inner leg with the main beam; and wherein the means for converting the rotational power extends along a laterally exterior side of the inner leg.

8. The power machine of claim 7, wherein the means for converting the transmitted and rotational power are pinned to the lift arm within the tilt actuator pocket, and the tilt actuator pocket opens downwardly along the inner leg.

9. The power machine of claim 8, wherein the lateral jog defines a laterally interior wall of the tilt actuator pocket.

10. The power machine of claim 6, wherein a portion of the means for converting the transmitted power extends to a laterally interior side of the main beam.

11. The power machine of claim 6, wherein the extension axis of the means for converting the rotational power is aligned, in a front-to-back direction of the power machine, with a lateral side wall of the main beam.

12. The power machine of claim 6, wherein a pinned connection between the lift arm and the means for converting the transmitted power is supported at a first boss of the lift arm that extends laterally inboard of the main beam of the lift arm.

13. The power machine of claim 5, wherein the means for converting the transmitted power and the means for converting the rotational power are secured to the lift arm within the tilt actuator pocket that extends along a lower beam of the lift arm, the tilt actuator pocket opening downwardly toward the implement or implement carrier, with the lift arm in the fully lowered orientation.

14. The power machine of claim 13, wherein at least a portion of the means for converting the transmitted power is shielded by laterally exterior and laterally interior sides of the tilt actuator pocket.

15. A lift arm structure for a power machine having a frame, the lift arm structure comprising:

a lift arm that includes:

a main beam extending along a lateral side of the power machine from a first end proximate a rear of the power machine to a second end proximate a front of the power machine;

a lower beam coupled at a knee to the second end of the main beam, the lower beam extending downwardly from the main beam to an implement or implement carrier at a first end of the lower beam; and an electrical tilt actuator secured at an upper end within a tilt actuator pocket that extends into a distal end of the lift arm, the electrical tilt actuator including a motor and an extender configured to extend and retract to change an attitude of the implement or implement carrier relative to the lower beam, the extender extending to engage the implement or implement carrier and extending downwardly when the main beam and the lower beam are in a fully lowered position, and the motor being recessed within the tilt actuator pocket, aligned behind the extender within the tilt actuator pocket, and shielded by the lift arm along a laterally exterior side of the motor, with the lift arm structure in a fully lowered orientation, a front wall of the tilt actuator pocket shielding at least part of a front side of the extender.

16. The lift arm structure of claim 15, wherein the electrical tilt actuator extends downwardly from the upper end along a laterally exterior side of the lower beam.

17. The lift arm structure of claim 15, wherein the lower beam is offset from the main beam by an inward jog; and wherein the motor extends away from the inward jog within the tilt actuator pocket.

* * * * *